United States Patent [19]

Oshima

[11] 4,193,382
[45] Mar. 18, 1980

[54] STRATIFIED CHARGE TYPE COMBUSTION PROCESS FOR INTERNAL COMBUSTION ENGINE AND INTERNAL COMBUSTION ENGINE UTILIZING SAME

[75] Inventor: Yujiro Oshima, Ichinomiya, Japan

[73] Assignee: Kabushiki Kaisha Toyota Chuo Kenkyusho, Nagoya, Japan

[21] Appl. No.: 668,552

[22] Filed: Mar. 19, 1976

[30] Foreign Application Priority Data

Mar. 19, 1975 [JP] Japan .................................. 50-33912

[51] Int. Cl.² .................. F02M 25/06; F02B 17/00
[52] U.S. Cl. ........................ 123/119 A; 123/32 ST; 123/75 B
[58] Field of Search ............ 123/119 A, 32 ST, 75 B, 123/75 C

[56] References Cited

U.S. PATENT DOCUMENTS

| | | | |
|---|---|---|---|
| 2,701,556 | 2/1955 | Woerner | 123/119 A |
| 3,408,992 | 11/1968 | Von Seggern et al. | 123/75 B |
| 3,494,336 | 2/1970 | Myers et al. | 123/75 B |
| 3,507,261 | 4/1970 | Myers et al. | 123/119 A |
| 3,702,111 | 11/1972 | Weaving et al. | 123/119 A |
| 3,703,164 | 11/1972 | Weaving | 123/119 A |
| 3,799,130 | 3/1974 | Dahlstrom | 123/119 A |
| 3,924,592 | 12/1975 | Miyaki et al. | 123/32 ST X |
| 3,991,725 | 11/1976 | Nakagawa et al. | 123/32 ST X |
| 4,020,808 | 5/1977 | Yagi et al. | 123/119 A |

*Primary Examiner*—Tony Argenbright
*Attorney, Agent, or Firm*—Blum, Kaplan, Friedman, Silberman & Beran

[57] ABSTRACT

A combustion engine which may be either of the spark-ignition type or the compression-ignition type (Diesel engine) is so constructed that two separate charges having different compositions are injected into a combustion chamber during the intake stroke. The charges are maintained essentially separate, i.e., in stratified condition, during the compression stroke. The combustion process which ensues results in emission of substantially lower quantities of unburnt hydrocarbons, partially-burned hydrocarbons, carbon monoxide and nitrogen oxides than is the case with conventional engines operating either with non-stratified charges or with conventional exhaust gas recirculation systems. One of the charges includes recirculated exhaust gases.

62 Claims, 59 Drawing Figures

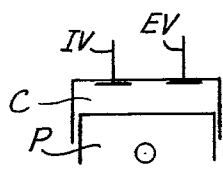
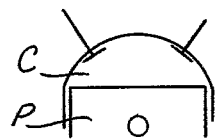
FIG.34A  FIG.34B  FIG.34C
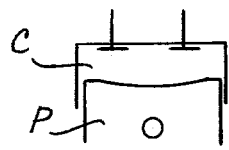
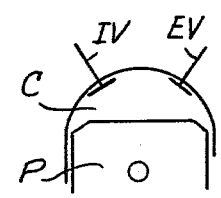
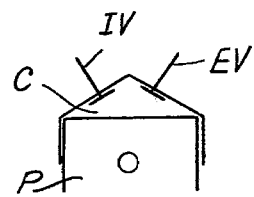
FIG.34D  FIG.34E  FIG.34F
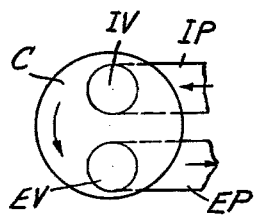
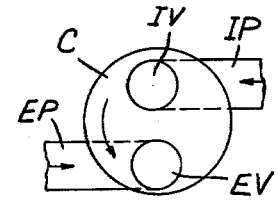
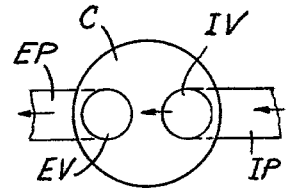
FIG.35A  FIG.35B  FIG.35C
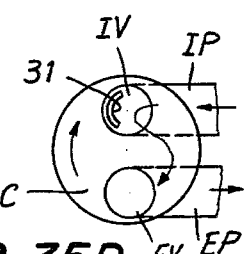
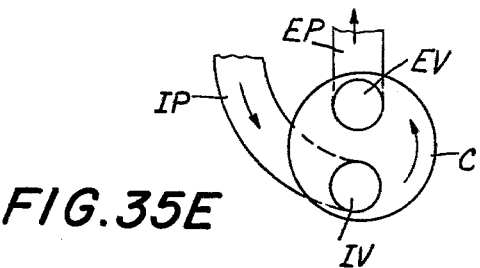
FIG.35D  FIG.35E
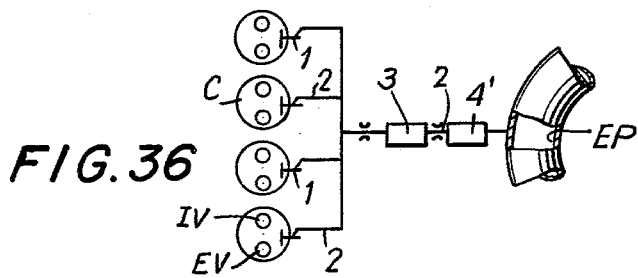
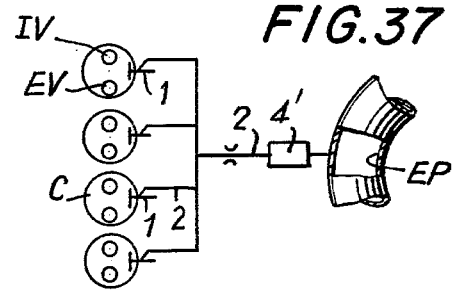
FIG.36  FIG.37

STRATIFIED CHARGE TYPE COMBUSTION PROCESS FOR INTERNAL COMBUSTION ENGINE AND INTERNAL COMBUSTION ENGINE UTILIZING SAME

BACKGROUND OF THE INVENTION

This invention relates to a stratified charge type combustion process for an internal combustion engine, and an internal combustion engine utilizing same, in which an inflammable mixture and residual exhaust gases are stratified and burnt in a combustion chamber or in a cylinder of an internal combustion engine, the objective being to reduce the quantity of nitrogen oxides ($NO_x$) in the exhaust gases without accompanying increase in the quantity of hydrocarbon therein or an increase in fuel consumption.

In general, when the air-fuel ratio A/F of the mixture supplied to the internal combustion engine is about 16, the quantity of nitrogen oxides, $NO_x$ emitted is a minimum. An air-fuel ratio larger than the above value (i.e., a leaner mixture charge) may reduce the quantity of $NO_x$ emitted. In a diesel engine, an increase in the excess air ratio aids in reduction in the quantity of $NO_x$ emitted or generated. An excess air ratio of $\lambda=1$ corresponds to the theoretical air-fuel ratio of about 15.

An excess air ratio $\lambda(>1)$ corresponds to a lean mixture charge condition for an engine of a spark ignition type. However, air-fuel ratios of over 18 to 19 result in an increase in the quantities of hydrocarbon and carbon monoxide emitted. This is due to the fact that if the air-fuel ratio A/F is increased, the flame propagating speed is reduced and the combustion temperature also drops, thus reducing the quantity of $NO_x$ emitted. However, the flame is extinguished in the close vicinity of the wall surface of the combustion chamber, so that combustion in this region is incomplete, leaving hydrocarbons, incompletely-burned hydrocarbons and carbon monoxide at the wall.

For reduction in the quantity of $NO_x$, there has been proposed an exhaust gas recirculation system (EGR), in which part of the exhaust gases is introduced through an intake pipe into a combustion chamber to be mixed with intake air or the intake mixture charge.

According to the exhaust gas recirculation system (EGR system) the exhaust gases are distributed substantially uniformly throughout a combustion chamber or a cylinder. This lowers the maximum combustion temperature in the central portion of the combustion chamber, thus reducing the quantity of $NO_x$ effectively. However, in the peripheral portion (near the wall surface) of the combustion chamber, there is little reduction in the quantity of $NO_x$, produced but there is a remarkable increase in the quantities of HC and CO produced.

In the case of combustion at a relatively high air-fuel ratio (high excess air ratio in the case of a diesel engine), even in the absence of exhaust gas recirculation, the flame reaches the wall surface of a combustion chamber at the final stage of combustion, and the wall surface of the combustion chamber is not heated so that the combustion temperature drops. Consequently, when exhaust gas recirculation is applied, the combustion temperature drops further so that the flame is extinguished before reaching the wall surface of the combustion chamber. Accordingly, the greater the quantity of recirculating exhaust gases introduced, the more difficult will be combustion at a high air-fuel ratio (a super-lean mixture combustion). This is also followed by an increase in the quantity of fuel unburned and an increase in fuel consumption.

Analysis of the results of experiments on the relationship between the quantities of $NO_x$, HC and CO produced in a cylinder and the gas temperature therein reveals that the temperature in the central portion of the combustion chamber (combustion gas temperature) has an important bearing on the quantity of $NO_x$ produced, while scarcely affecting the production of HC and CO. With regard to a diesel engine and a spark ignition type engine provided with a sub-chamber respectively, a tendency similar thereto is noted in the combustion gases which are firstly injected from a sub-chamber as well as those in the central portion of a combustion chamber. In addition the gas temperature in the vicinity of the wall surface of a combustion chamber, where a flame reaches in the later half or in the final stage of combustion has an important relation to the quantities of HC and CO, while exerting little influence on that of $NO_x$.

FIGS. 1A, and 1B represent the aforesaid relationship. The maximum gas temperature (°K.) is represented by the abscissa in both FIGS. 1A and 1B and the weights or amounts of $NO_x$, HC and CO exhausted are represented by the ordinate therein, FIG. 1A shows the weight of the aforesaid gases exhausted from the central portion of a combustion chamber, while FIG. 1(b) shows the weight of the aforesaid gases exhausted from the vicinity of the wall surface of a combustion chamber.

SUMMARY OF THE INVENTION

The present invention is based on the results of the aforesaid experiments. According to the present invention, there are provided in a cylinder of an internal combustion engine of the overhead valve type a first region containing a high concentration of residual exhaust gases in the central portion where there results little change in the quantity of HC and CO produced, relative to a change in the temperature of combustion gases, and a second region containing little residual exhaust gases in the vicinity of the wall surface of the combustion chamber, thereby providing stratified charges to said first region including said exhaust gases and a second region charged only with an inflammable mixture. The stratified charges thus produced are ignited and burned, so that the production of $NO_x$ in the central portion may be suppressed, without an accompanying increase in the quantities of HC and CO produced in the vicinity of the wall surface of the combustion chamber. As is apparent from the foregoing, the principle of the present invention is entirely different from that of the conventional EGR system, and presents the remarkable features of reducing the quantity of $NO_x$ alone, without increasing the quantities of HC and CO.

According to the stratified charge type combustion process for an internal combustion engine of the present invention, wherein an inflammable mixture of air and fuel supplied into a combustion chamber of the internal combustion engine is ignited and burned; during the intake stroke of an engine, an inflammable mixture and exhaust gases are supplied into a combustion chamber, so that said exhaust gases stay in the central portion of the combustion chamber, without diffusing throughout the combustion chamber; during the compression stroke, there are formed a region containing a high concentration of exhaust gases in the central portion of the combustion chamber, and another region containing the inflammable mixture charge in a manner to encompass the aforesaid region therewith, within the combustion chamber, thereby providing stratified charges; and during the combustion stroke, the inflammable mixture charge is ignited for burning the aforesaid stratified charges of the exhaust gases and inflammable mixture charge.

According to another aspect of the present invention, the internal combustion engine, wherein an inflammable mixture charge of air and fuel supplied in a combustion chamber of an internal combustion engine, comprises, an opening which opens into the combustion chamber and is directed towards the axis direction thereof, an exhaust gas supply passage communicating with an exhaust gas passage which discharges exhaust gases, with the aforesaid opening, from the combustion chamber outside; valve means located in the exhaust gas supply passage and controlled so as to allow the communication of the combustion chamber with the exhaust gas passage, during the intake stroke; and throttle means located in the exhaust gas supply passage for controlling a throttle amount thereof in accordance with the r.p.m. and boost pressure of the internal combustion engine and supplying a given quantity of exhaust gases.

According to still another aspect of the stratified charge type combustion process for an internal combustion engine and an internal combustion engine using same; during the intake stroke of an engine, an inflammable mixture charge and exhaust gases are supplied into a combustion chamber while exhaust gases are supplied to the central portion of the combustion chamber in a given quantity; during the compression stroke, there are created a region containing a high concentration of exhaust gases in the central portion of the combustion chamber, and another region containing an inflammable mixture charge in a manner to encompass the aforesaid another region therewith, thereby providing stratified charges; and during the combustion stroke, the inflammable mixture charge is ignited, thereby burning the stratified charges of exhaust gases and inflammable mixture charge. Thus, the quantity of $NO_x$ alone may be reduced, without an accompanying increases in the quantities of HC and CO to be produced. In addition, the process and the internal combustion engine according to the present invention are applicable to all types of gasoline engines and diesel engines, without increasing the fuel consumption, or lowering a super-lean-combustion-limit-air-fuel-ratio, presenting many other advantages in the practical application.

It is an object of the present invention to provide a stratified charge type combustion process for an internal combustion engine, and an internal combustion engine using same, said engine being simple in construction and effective in reducing the quantity of $NO_x$ alone, without increasing the quantities of HC and CO.

It is another object of the present invention to provide a stratified charge type combustion process for an internal combustion engine, and an internal combustion engine utilizing same, which is applicable to all overhead valve types of gasoline engines and a diesel engine, and retains a super-lean-combustion-limit-air-fuel-ratio, without increasing the fuel consumption.

Still other objects and advantages of the invention will in part be obvious and will in part be apparent from the specification.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIGS. 29A to 29F and 30A to 30F are sectional views of exhaust gas inlet ports;

FIGS. 34A to 34C and 35A to 35C illustrate chamber head configurations;

FIGS. 35A to 35F show exhaust and inlet configurations; and

FIGS. 36 and 37 show exhaust gas distribution manifolds for engines having a plurality of cylinders.

DESCRIPTION OF THE PREFERRED EMBODIMENTS

Figure 1A:
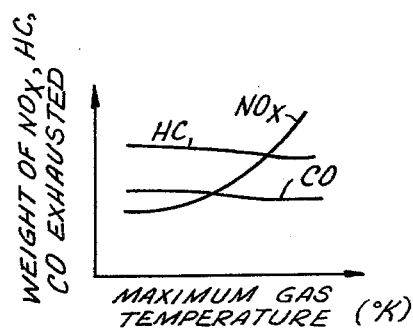
FIG. 1A and FIG. 1B are line graphs showing the relationship between the maximum gas temperature and the quantities of $NO_x$, HC and CO being exhausted for, respectively the central and wall portions of a cylinder in an internal combustion engine.

FIGS. 2 to 6 show the first embodiment of the present invention which is applied to a conventional internal combustion overhead valve engine E (a single chamber type without a sub-combustion chamber) of a spark ignition type, having a carburetor. As shown, a spark plug SP is provided in the peripheral wall of a combustion chamber C. The engine is provided with an intake valve IV (FIG. 3) and an exhaust valve EV. An exhaust gas intake valve 1 as a valve means of a smaller size than that of the exhaust valve EV is provided close to the central portion of the combustion chamber C for controlling the opening and closing of said exhaust gas supply passages. The exhaust gas intake valve 1 (FIG. 2) is provided with a sub-chamber 1a of a small volume, which communicates with the combustion chamber C, through an exhaust gas nozzle 1b opening into said combustion chamber. The exhaust system of exhaust gas intake valve 1 is composed of an exhaust-gas-leading pipe 2 serving as an exhaust gas supply passage, which has a diameter smaller than that of an exhaust system (This will be referred to as a main exhaust system) of the exhaust valve EV, a control valve 3 serving as a throttle means and a filter 4' for excluding particulates in the exhaust gases. The flow rate of exhaust gases passing through the exhaust gas system of the exhaust gas intake valve 1 should be less than 15 to 20% of that exhaust gases passing through the main exhaust system. The range of the flow rate of exhaust gases, to be introduced for reducing the quantity of $NO_x$, without any accompanying lowering in fuel consumption, is from 3 to 12%. This construction of the engine presents advantages over those provided by the conventional system.

Figure 4:
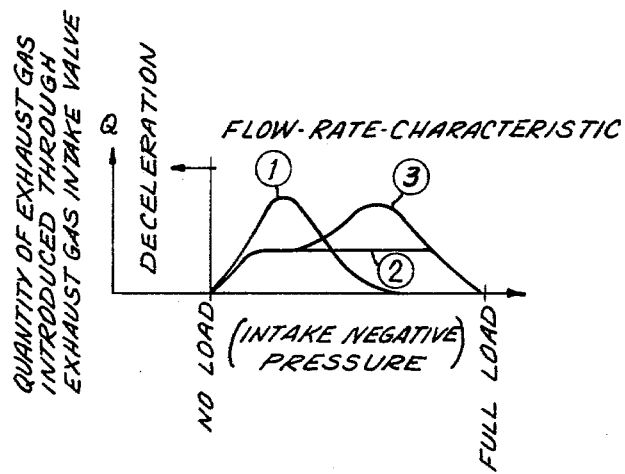
Figure 6:
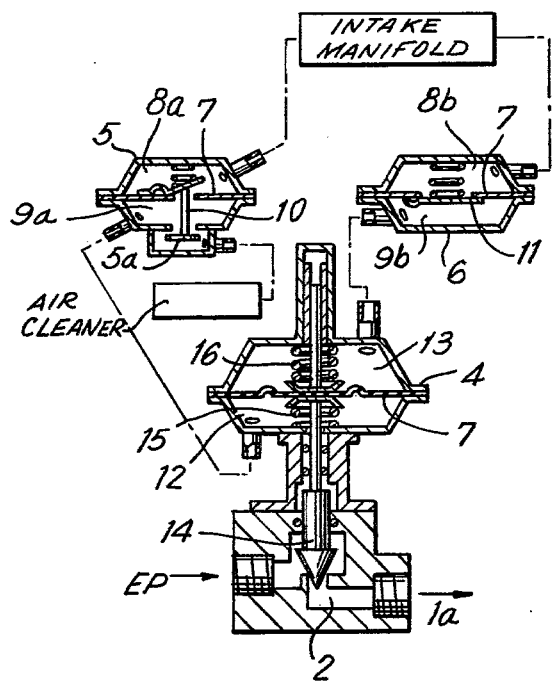

The flow rate of the exhaust gas through its intake valve 1 is preferably zero during engine deceleration, very low or zero during engine idling, and zero during full load operation to prevent lowering in power output. In other words, in the case where a motor vehicle using this type of internal combustion engine is to reduce the quantity of $NO_x$ produced at low load, the exhaust-gas-flow-rate characteristic as shown by curve 1 in FIG. 4 is required for the range covering from no load running to a full load running of an engine. The characteristic referred to describes the quantity of exhaust gas returned to the cylinder. On the other hand, in the case of an average type vehicle where it is desired to reduce the quantity of $NO_x$ throughout the range from no load to full load, the exhaust gas-flow-rate characteristic as shown by a curve 2 is required. Furthermore, in the case where a motor vehicle using this type of internal combustion engine is to reduce the quantity of $NO_x$ even at a high load, then the exhaust-gas-flow rate characteristic as shown by a curve 3 is required. The first embodiment refers to the aforesaid average type vehicle, and requires a control valve 3 for opening and closing the exhaust gas intake valve 1 by means of a cam CM. The control valve 3, as shown in FIG. 6, comprises an exhaust valve 4 of a diaphragm type, and first and second check valves 5, 6.

The first and second check valves 5 and 6 have chambers 8a and 8b, and chambers 9a and 9b, which are partitioned by diaphragms 7, respectively. The aforesaid chambers 8a and 8b are connected with an intake manifold (not shown) and also communicate with chambers 9a and 9b by way of valve members 10 and 11, respectively. The exhaust valve 4 has chambers 12 and 13 which are partitioned by a diaphragm 7 while the chambers 9a and 9b communicate with the chambers 12 and 13, respectively. A needle valve 14 is secured to the diaphragm 7 at its center and extends through said diaphragm, and springs 15 and 16 are confined between the diaphragm 7 and the opposite walls of the valve 4, respectively. The needle valve 14 has a tip portion which opens or closes the exhaust-gas-leading passage 2. When the negative pressure is high such as during engine deceleration, valve member 10 of the first check valve 5 overcomes the force of a spring to open the communication between the chambers 8a and 9a, thereby transmitting said negative pressure to the chamber 12 of the exhaust valve 4. The negative pressure acting on the second check valve 6 closes a valve member 11, thereby interrupting the transmission of the pressure to the chamber 13 of the exhaust valve 4. As a result, the needle valve 14 of the exhaust valve 4 overcomes the force of a spring 15 of the chamber 12 to close the exhaust gas passage 2. On the other hand, when the negative pressure is decreased to −400 to −450 mm Hg, the diaphragm is deflected towards the chamber 13 against the force of a spring 16, so that the needle valve of the exhaust valve 4 opens said passage 2. Also, the spring of the first check valve 5 overcomes the negative pressure, so that the valve member closes and cuts the communication of the chamber 8a and the chamber 9a, while the chamber 9a is connected to the exterior atmosphere, since the valve member 10 opens a path to the exterior. The valve member 11 of the second check valve 6 opens because a spring therein overcomes the negative pressure. As a result, the diaphragm 7 in the exhaust valve 4 is deflected to the side of chamber 13, thereby bringing the needle valve 14 up to open said passage 2. During high load running condition, such that the negative pressure in the intake pipe IP is lowered to about −100 mmHg, the force of a spring in the valve 4 overcomes the load in the chamber 13, thereby closing the needle valve 14 of the exhaust valve 4.

During deceleration, again, the negative pressure in the intake pipe IP is increased, and when the load therein is lowered to −550 mm Hg, the first check valve 5 is opened, the valve member 10 is closed from the atmosphere, and the second check valve 6 is closed, so that the diaphragm 7 is deflected to the side of the chamber 12 due to the negative pressure prevailing in the chamber 12, thereby bringing the needle valve 14 of the exhaust valve 4 down to close said passage 2.

Figure 1B:
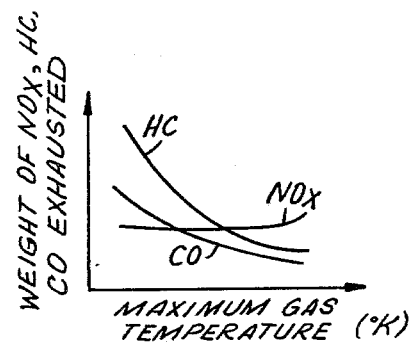
Figure 2:
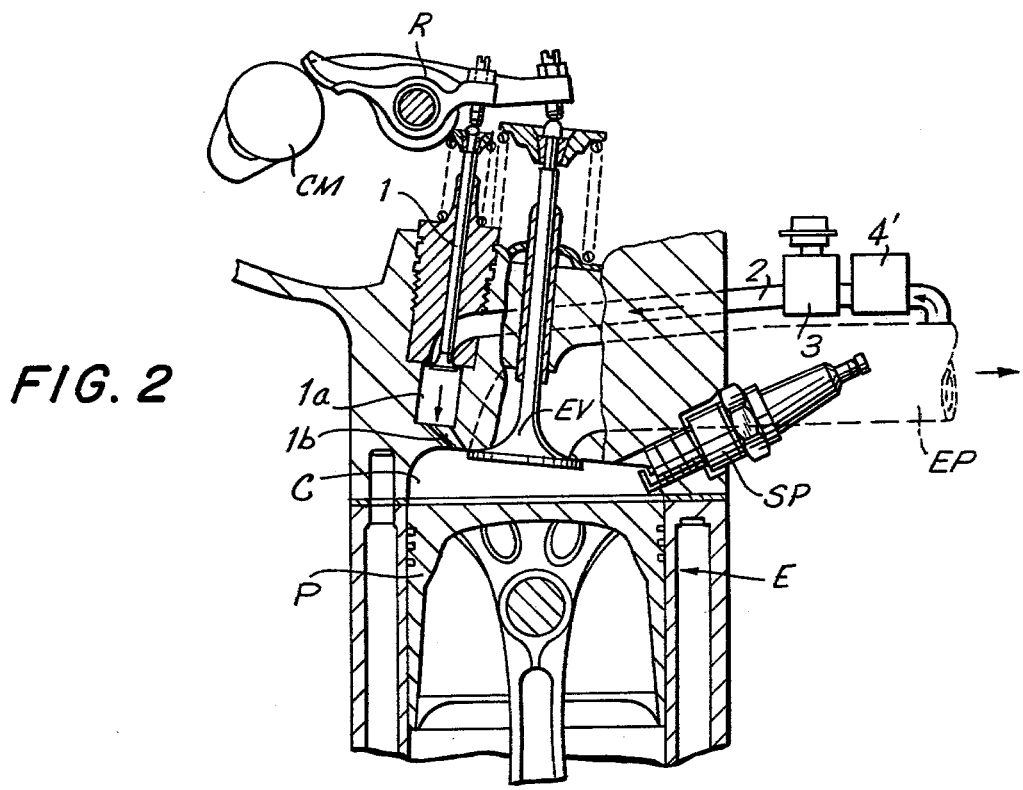
FIGS. 2 through 6 are schematic views illustrative of the first embodiment of the invention.
Figure 3:
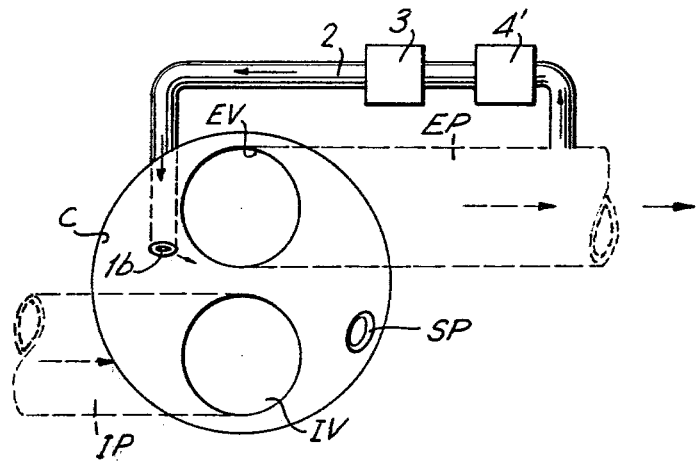
Figure 5:
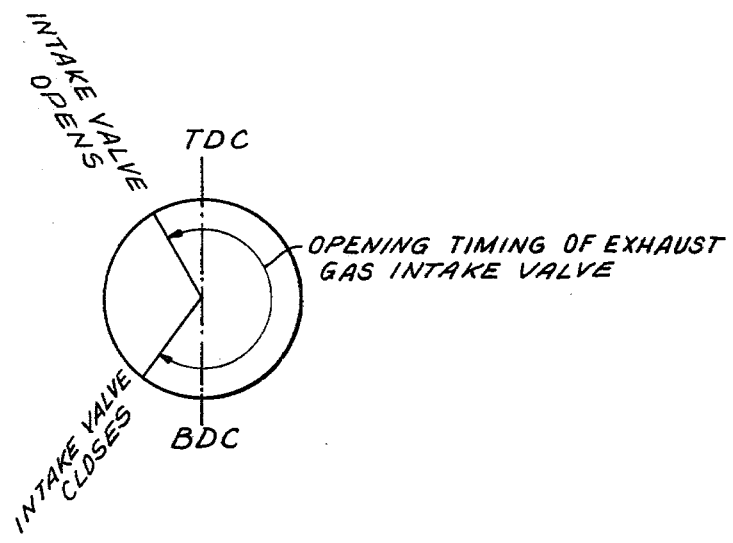

As shown in FIG. 5, the exhaust gas intake valve 1 is set open during the intake stroke. Exhaust gases are introduced into the combustion chamber C through the main exhaust system, due to negative pressure in the combustion chamber C, which pressure is created due to the descending of a piston P. In the various Figures, P represents a piston, IP an intake pipe, EP an exhaust pipe, and R a rocker arm for the intake valve. Also, TDC is top dead center and BDC is bottom dead center. The operation of the first embodiment of the present invention having the above construction will now be explained. The exhaust gas intake valve 1 is opened due to a depressing force of the rocker arm R (FIG. 1) which is turned by the rotation of the cam CM in the final stage of the exhaust stroke. When the piston P approaches the top dead center, the intake valve IV is opened; then as the piston P descends, the pressure within the combustion chamber C is decreased, so that a fresh mixture is introduced through the intake valve IV. Simultaneously, exhaust gases are introduced from the main exhaust system by way of filter 4', control valve 3, pipe 2, and then through the exhaust gas intake valve 1 past the nozzle 1b into the top of the central portion of the combustion chamber C, thereby creating an exhaust gas cloud therein. The exhaust gas intake valve 1 is closed at a time prior to the closing of the intake valve IV which is closed upon completion of the intake stroke. The piston P passes through the bottom dead center, and begins to ascend to initiate the compression stroke; the exhaust gases introduced through the exhaust gas intake valve are still stratified in the top central portion of the combustion chamber C, without having diffused throughout the combustion chamber so that an exhaust gas cloud has been created. The chamber contents are ignited by means of the spark plug SP positioned in the peripheral wall of the chamber C. Both the combustion temperature and propagation speed of the flame in the peripheral portion of the chamber C are high and the concentration of exhaust gases is low in said portion. As a result, concentrations of HC and CO are lowered, while the quantity of $NO_x$ is not increased. In addition, since the concentration of exhaust gases is high and the combustion temperature is low in the central portion of the combustion chamber C, the production of $NO_x$ is decreased. Moreover, the ratio of surface area to volume for the central portion of the chamber C is small, and the central portion is encompassed with a flame prevailing along the peripheral wall of the chamber C, so that the quantities of HC and CO are not increased, thereby achieving the desired objective of decreasing $NO_x$ emission without a corresponding increase in HC and CO.

Figure 7A:
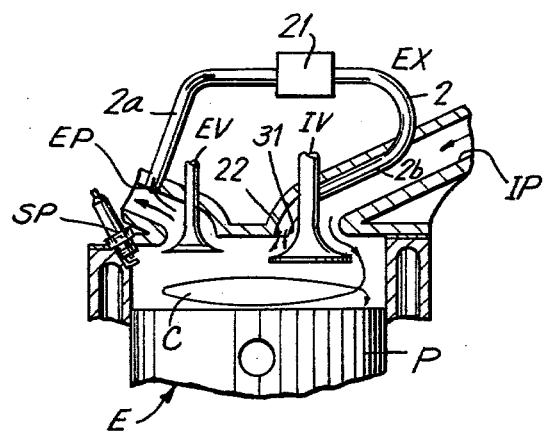
FIGS. 7 through 9 are schematic views illustrative of the second embodiment of the invention.
Figure 7B:
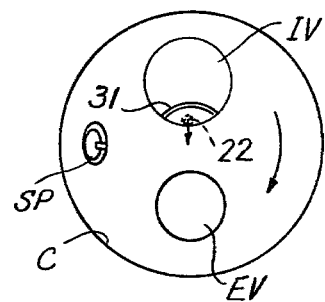
Figure 8:
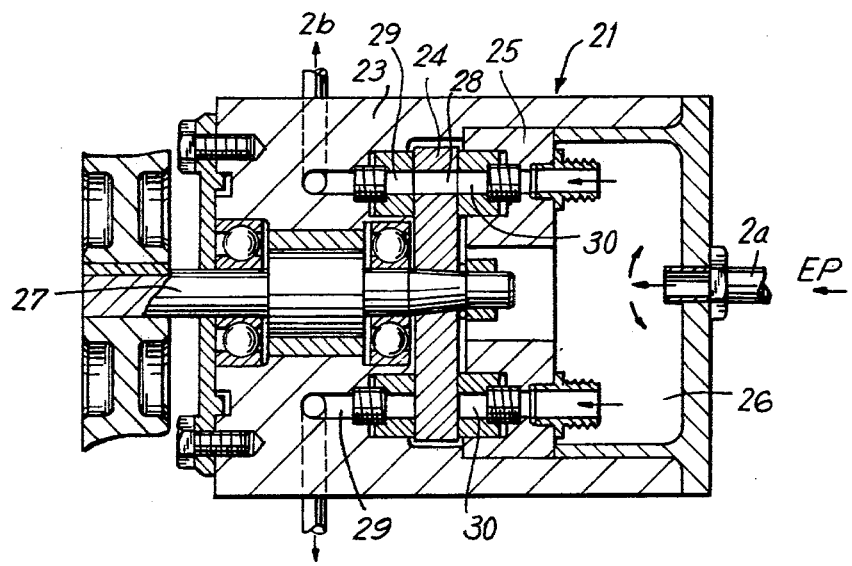
Figure 9:
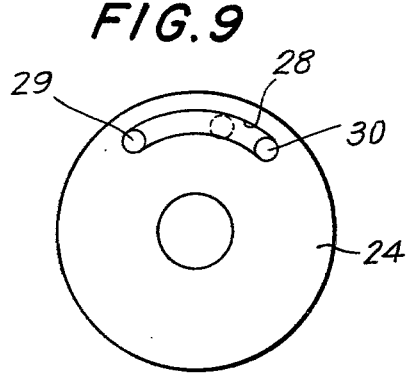

The second embodiment of the present invention is applied to an ordinary type internal combustion engine having a carburetor. Unlike the first embodiment, the second embodiment includes an exhaust-gas-leading pipe 2 (FIG. 7A) having a predetermined diameter thereof in order to operate as an orifice and an intake valve IV serving as passage-opening-and-closing-control means, and a synchronizing valve 21 (FIG. 7A) operable in synchronism with the intake valve IV, as shown in FIGS. 7A, 7B, 8 and 9. As shown in FIGS. 7A and 7B, one end of the exhaust-gas-leading pipe 2 communicates with and opens into the exhaust pipe EP of the main exhaust system, and the other end thereof extends along the inner surface of the intake pipe IP of the intake system. The opening 22 of said other end of the pipe 2 is directed towards the axis of the chamber C and is opened and closed by means of the valve head of the intake valve IV. As shown in FIGS. 8 and 9, the synchronizing valve 21 comprises a case body 23, a rotary disc 24, an annular member 25, and an exhaust gas sump 26. The rotary disc 24 is integrally secured on a rotary shaft 27, which is connected to a rotary shaft (not shown) of the cam CM in synchronism relation thereto, so as to rotate at the same rate as the rotary shaft of the cam CM (½ r.p.m. per 1 r.p.m. of a crank shaft), and positioned in a cavity of the case body 23 so as to face the annular member 25. Provided in the rotary disc 24 along its outer periphery is an arcuate slot 28 (FIG. 9) which periodically connects opening 29 of case body 23 with opening 30 of the annular member 25. The annular member 25 cooperates with the operations of a throttle valve (not shown) of a carburetor by means of a linking mechanism (not shown), to rotate in the normal reverse directions about the axis thereof. The exhaust gas sump 26 is defined by the case body 23 and annular member 25. One end of said sump communicates with the exhaust pipe EP through an exhaust gas leading pipe 20, and the other end thereof communicates with the exhaust-gas-leading pipe 2b extending within the exhaust pipe EP, when aperture 30 of the annular member 25, slot 28 of the disc member and a communicating hole 29 of the case body 23 are in registry with each other. Thus, the synchronizing valve 21 synchronizes with the rotation of an internal combustion engine and cooperates with the opening and closing operations of the throttle valve of a carburetor, rotating the rotary disc 24 proximate annular member 25 so as to provide properly timed communication between openings 29 and 30. Thus, the correct quantity of exhaust gases is supplied to the combustion chamber with appropriate timing corresponding to the operating conditions of an internal combustion engine. With regard to the second embodiment of the invention, the spark plug SP is positioned in the peripheral portion of the combustion chamber C and not in the central portion thereof, as shown in FIGS. 7A and 7B. A shroud 31 projects from an upper surface of the head of the intake valve IV, so that the fresh mixture from the intake pipe IP may flow along the peripheral wall of the combustion chamber C, following a spiral or helical pattern.

When the piston P approaches the top dead center, the intake valve IV is opened; as the piston P descends, the pressure in the combustion chamber C is lowered, fresh mixture is introduced through the opened intake valve IV into the peripheral portion of the combustion chamber in a helical pattern, while exhaust gases are introduced into the top portion of the combustion chamber C from the exhaust-gas-leading pipe 2 through the synchronizing valve 21 as throttle means in synchronism with the opening of said intake valve. Thus, an exhaust gas cloud is created in the central portion of the chamber C. Upon completion of the intake stroke of the internal combustion engine, the intake valve IV is closed. When the piston P passes through the bottom dead center, the piston P begins ascending to enter the compression stroke. The exhaust gases which have been introduced through the exhaust-gas-leading pipe 2 are stratified in the form of a gas cloud in the central portion of the combustion chamber C, without diffusing through the remainder of combustion chamber C. On the other hand, the fresh mixture introduced rotates about the axis of the combustion chamber along the peripheral portion thereof following a helical path, thereby creating a fresh mixture cloud surrounding the aforesaid exhaust gas cloud, thus completing the stratification of the fresh mixture and the exhaust gases. When said stratified cloud is ignited by means of the spark plug SP which is disposed in the peripheral portion of the chamber, there results a high combustion temperature and a high flame propagation speed in the peripheral portion thereof, because the concentration of exhaust gases in the peripheral portion is low. As a result, the concentrations of HC and CO are lowered and the concentration of $NO_x$ is not increased. The concentration of exhaust gases in the central portion of the combustion chamber is high and thus the combustion temperature in this region is low, so that the production of $NO_x$ is suppressed. In addition, the ratio of surface area to volume of the central portion of the combustion chamber C is small, and the central portion of the chamber is encompassed with a flame, so that the quantities of HC and CO are not increased.

Figure 10A:
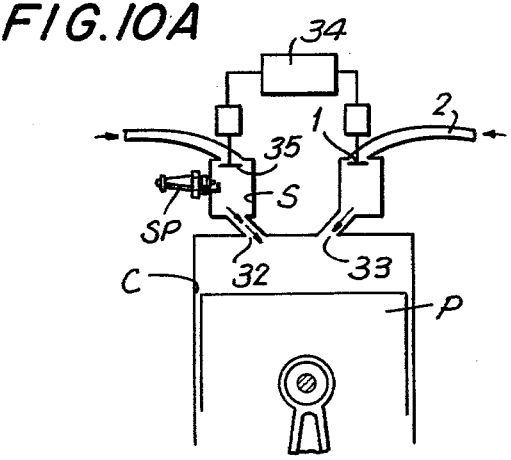
FIGS. 10A to 12 are schematic views illustrative of the third embodiment of the invention.
Figure 10B:
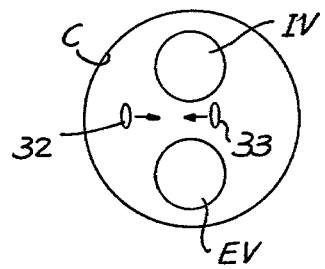

In the third embodiment of the invention a stratified charge type internal combustion engine has a sub-combustion chamber, unlike the first and second embodiments. As shown in FIGS. 10A and 10B, the combustion chamber C is provided with a communicating opening 32 and an exhaust nozzle 33 in symmetric relation with respect to the axis of the combustion chamber C. The opening 32 connects chamber C with sub-combustion chamber S, and the nozzle 33 connects chamber C with exhaust-gas-leading pipe 2. The passage-opening-and-closing-control means for the exhaust gas intake valve 1 of the internal combustion engine of the third embodiment is hydraulic valve drive means 34 which hydraulically opens and closes sub-combustion chamber intake valve 35 for supplying an appropriate quantity of a rich mixture charge into the sub-combustion chamber at an appropriate timing.

Figure 11:
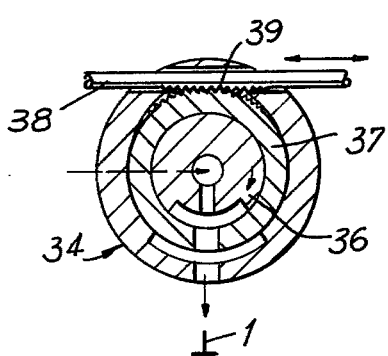
Figure 12:
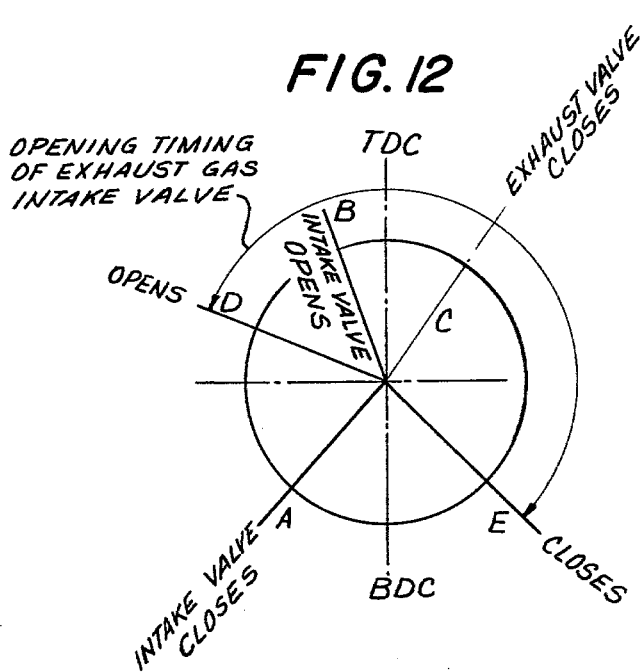

In the hydraulic valve drive means 34 as shown in FIG. 11, the exhaust gas intake valve 1 is opened and closed by rotating a control ring 37 of a rotary distribution valve 36, which rotates at a rate half that of a crank shaft, with the aid of an opening-and-closing timing-control rack 38 and a pinion 39. In this case, as shown in FIG. 12, when the closing timing of the exhaust gas intake valve 1 coincides with the closing timing of the intake valve IV, with the opening period of the exhaust gas intake valve 1 remaining unchanged, the quantity of exhaust gases introduced through the exhaust gas intake valve 1 becomes maximum. Where the closing timing of the exhaust gas intake valve 1 is positioned between the closing timing and the opening timing of the intake valve IV, the opening timing (D) of the exhaust gas intake valve 1 is positioned during the exhaust stroke. During this period of time, exhaust gases are discharged through the exhaust gas intake valve 1. When the closing time of the exhaust gas intake valve (E) coincides with that of the exhaust valve (C), the quantity of exhaust gases being introduced becomes zero.

The ignition portion of a spark plug SP is disposed in the sub-combustion chamber S, between the intake valve 35 and the aperture 32. The upstream side of the sub-combustion chamber intake valve 35 is connected to a carburetor (not shown) for supplying a rich mixture charge into the sub-combustion chamber S. The upstream side of the intake valve IV of the combustion chamber C communicates with a carburetor (not shown) for introducing a lean mixture charge into the combustion chamber C. The arrangements of the exhaust gas intake valve 1 and exhaust-gas-leading pipe 2 which serves as an exhaust gas supply passage are similar to those in the first embodiment.

The operation of the internal combustion engine of the third embodiment will be described. In the final stage of the exhaust stroke, the exhaust valve EV is maintained open, and the exhaust gas intake valve 1 as valve means is opened due to a hydraulic pressure supplied from the hydraulic valve drive means 34. When the piston P approaches the top dead center, intake valve IV is opened. As the piston P descends, the pressure within the combustion chamber C drops, whereupon a rich mixture charge is introduced through the intake valve 34 into the sub-combustion chamber S and thence into the central portion of the combustion chamber C. At the same time, a lean mixture charge is introduced through the intake valve IV into the combustion chamber C, while exhaust gases are introduced from the main exhaust system through the exhaust-gas-leading pipe 2 and then through the intake valve IV into the top, central portion of the combustion chamber C to be mixed with the aforesaid rich mixture charge. Thus, a mixture of the rich mixture charge with exhaust gases, and a lean mixture charge provide clouds, respectively. The exhaust gas intake valve 1 is closed at a timing earlier than that of the intake valve IV in the course of the intake stroke, while the intake valve IV is closed upon completion of the intake stroke. When the piston P passes the bottom dead center, the piston P begins ascending to enter the compression stroke. The cloud created by a mixture of a rich mixture charge with exhaust gases in the central portion of the combustion chamber C during the intake stroke, is retained, without being diffused throughout the chamber during the compression stroke. A fresh lean mixture charge is introduced into the combustion chamber C during the intake stroke to form a cloud along the peripheral wall of the combustion chamber, while part of the lean mixture charge is diffused throughout the cloud in the central portion of the combustion chamber C. When the rich mixture charge is ignited by means of the spark plug SP in the sub-combustion chamber S, a flame is injected through the communicating hole 32 into the central portion of the combustion chamber C, thereby igniting and burning the exhaust gas cloud with which part of the rich mixture charge is mixed, and then igniting and burning the lean mixture charge cloud along the peripheral portion of the combustion chamber C. Since the concentration of exhaust gases in the peripheral portion of the combustion chamber C is low, both combustion temperature and propagation speed of the flame are high. As a result, the quantities of HC and CO are reduced, and the quantity of $NO_x$ is not increased. Since the concentration of exhaust gases is high in the central portion of the combustion chamber C and thus the combustion temperature is low, the production of $NO_x$ is suppressed. Furthermore, since the ratio of surface area to volume in the central portion of the combustion chamber C is small, the quantities of HC and CO in the central portion are not increased.

Figure 13A:
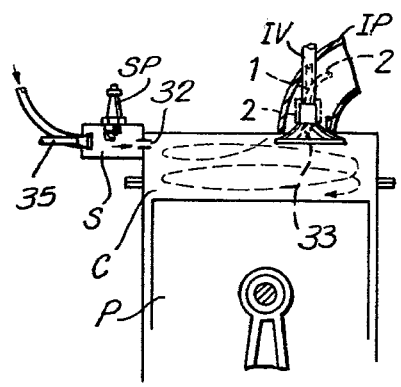
FIGS. 13A to 15 are schematic views illustrative of the fourth embodiment of the invention.
Figure 13B:
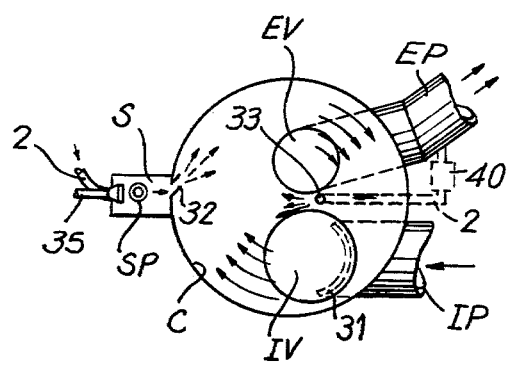
Figure 14:
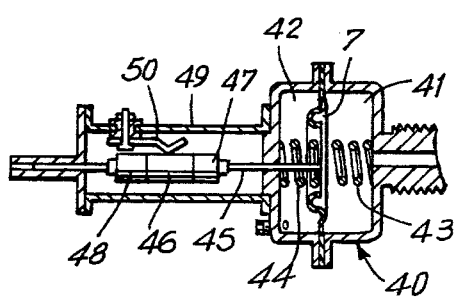
Figure 15:
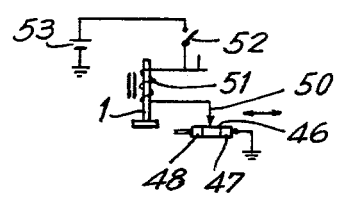

The internal combustion engine of the fourth embodiment is similar to the stratified charge type internal combustion engine having the sub-combustion chamber of the third embodiment, except that the passage-opening-and-closing-means as valve means for the exhaust gas intake valve is provided within the exhaust gas-introducing pipe having a predetermined diameter. This valve means is an electro-magnetic valve which is opened and closed in response to an intake pressure. The sub-combustion chamber S (FIGS. 13A and 13B) is positioned adjacent to the side wall of the combustion chamber C. A communicating orifice 32 connects the sub-combustion chamber S with the combustion chamber C and is directed tangentially with respect to the wall of the combustion chamber C. A shroud 31 projects from the valve head of the intake valve IV, so that a fresh lean mixture charge from the intake pipe IP is introduced along the peripheral portion of the combustion chamber C and about the axis thereof, following a helical pattern. The flow direction of part of a rich mixture charge introduced through the orifice 32 into the combustion chamber C coincides with the direction of the helical or swirl motion of the aforesaid lean mixture charge. The exhaust gas intake valve 1 is positioned in the top, center portion of the combustion chamber C. The downstream side of the valve 1 communicates by way of control valve 40 and exhaust-gas-leading pipe 2 with the exhaust pipe EP. The control valve 40, as shown in FIGS. 14 and 15, consists of a diaphragm type electric switch sensitive to pressure. The control valve 40 has chambers 41 and 42 separated by diaphragm 7. The chamber 41 communicates with an intake manifold (not shown) and the other chamber 42 communicates with the atmosphere. Springs 43 and 44 are positioned on the opposite sides of the diaphragm 7, respectively. Secured to the diaphragm 7 is a stem 45 which extends to the side of the chamber 42. As shown in FIGS. 14 and 15 contacts 47 and 48 are secured to the end of the stem 45 with an insulating body 46 being sandwiched therebetween. The contacts 47, 48 and insulating body 46 slidingly contact a terminal 50 which is mounted on the case body 49 and insulated therefrom. The terminal 50 (FIG. 15) is electrically connected to an electromagnetic solenoid 51 of the exhaust gas intake valve 1, and to an electric power source 53 by way of engine key 52. The electric switch is designed to respond only to a maximum negative pressure and a minimum negative pressure within the intake manifold, and to feed current to the electromagnetic solenoid to close the exhaust gas intake valve 1.

In the operation of this fourth embodiment of the invention, the exhaust gas intake valve 1 is opened by an electric signal from the electric switch 50 at the final stage of the exhaust stroke. When the piston P approaches the top dead center, the intake valve IV is opened. As the piston P descends, the pressure in the combustion chamber C drops, whereupon a rich mixture charge is introduced through the intake 35 into the sub-combustion chamber S, with part of a rich mixture charge being introduced along the peripheral portion of the combustion chamber C, following a spiral pattern. A lean mixture charge is introduced through the intake valve IV into the combustion chamber C, following a helical pattern, while exhaust gases are introduced from the main exhaust system through the exhaust-gas-leading pipe 2 and then through the exhaust gas intake valve 1 into the top, central portion of the combustion chamber C to be mixed with the aforesaid part of lean mixture charge. Thus, a rich mixture charge, a lean mixture charge and exhaust gases create clouds in a more satisfactory manner, as compared with those in the preceding embodiments. The exhaust gas intake valve 1 is closed at a timing earlier than that of the intake valve IV in the course of the intake stroke, while the intake valve IV is closed upon completion of the intake stroke. When the piston P passes the bottom dead center, then the piston P begins ascending to enter the compression stroke. The exhaust gases which have been introduced through the exhaust gas intake valve 1 are mixed with the aforesaid part of the lean mixture charge to be stratified in the central portion of the combustion chamber C, and to create an exhaust cloud without diffusing throughout the chamber C during the compression stroke. The fresh rich mixture charge is partly introduced to the peripheral portion of the combustion chamber C to create a cloud of a rich mixture charge which is to be mixed with the aforesaid lean mixture charge, thereby allowing the stratification of the both clouds. When the rich mixture charge is ignited within sub-combustion chamber SP by means of the spark plug SP the flame thus produced is injected through the orifice 32 toward the peripheral portion of the combustion chamber C to thereby ignite and burn part of the rich mixture charge and a lean mixture cloud to be mixed therewith, and then ignite and burn the exhaust gas cloud in the central portion of the combustion chamber C. The concentration of exhaust gases in the peripheral portion of the combustion chamber C is low so that both combustion temperature and flame propagation speed are high. As a result, the quantities of HC and CO are lowered, while the quantity of $NO_x$ is not increased. The concentration of exhaust gases in the central portion of the combustion chamber C is high and the resulting combustion temperature is low, so that the production of $NO_x$ is suppressed. Furthermore, the ratio of surface area to volume in the aforesaid central portion is small, and the central portion is encompassed with a flame prevailing along the peripheral portion of the combustion chamber C, so that the quantities of HC and CO are not increased.

Figure 16:
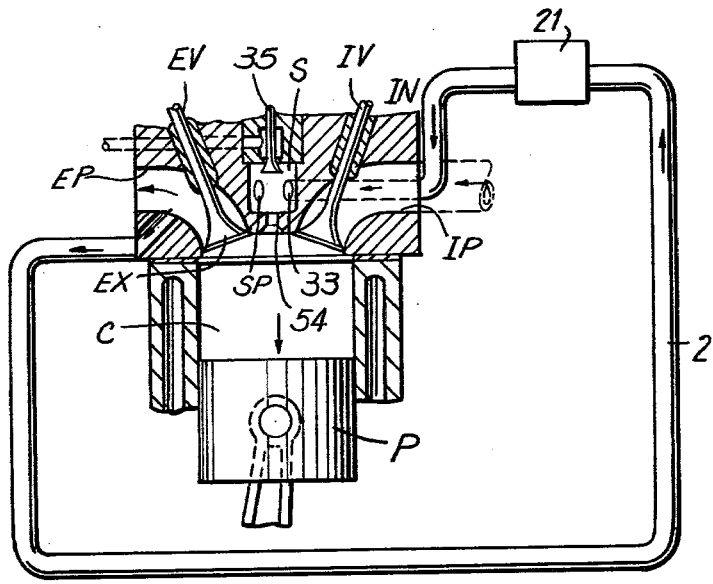
FIGS. 16 and 17 are longitudinal and transverse cross sectional views showing the fifth embodiment of the invention.
Figure 17:
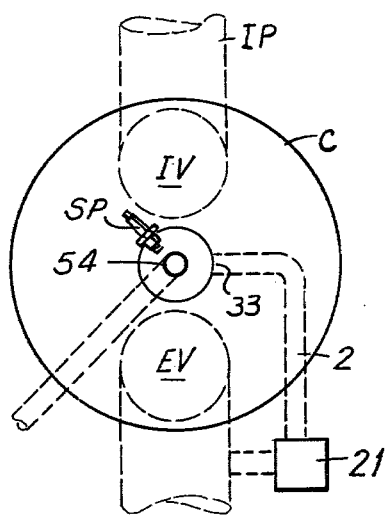

The internal combustion engine of the fifth embodiment of the invention is similar to the third and fourth embodiments in that each is a stratified-charge type internal-combustion engine with a sub-combustion chamber. The difference is that, as shown in FIGS. 16 and 17, a rich mixture charge-intake pipe is connected by way of a sub-combustion-chamber-intake valve 35 with the sub-combustion chamber S, and an exhaust-gas-leading pipe 2 also joins sub-combustion chamber S downstream of intake valve 35. A spark plug SP is positioned in the wall of sub-chamber S opposite the opening of the aforesaid gas-leading pipe 2. In the internal combustion engine of the fifth embodiment, the sub-combustion chamber S is positioned above the top central portion of the combustion chamber C and communicates through a channel 54 with the combustion chamber C. The upstream side of the exhaust-gas-leading pipe 2 communicates through a synchronizing valve 21 similar to that of the second embodiment with exhaust pipe EP of the main exhaust system.

In the operation of the internal combustion engine of the fifth embodiment, when the piston P approaches the top dead center, the exhaust-gas-leading pipe 2 is opened by means of the synchronizing valve 21 as valve means and throttle means at the final stage of the exhaust stroke, during which time the exhaust valve EV is maintained opened. Then the intake valve IV is opened and as the piston P descends, the pressure in the combustion chamber C drops, whereupon a fresh lean mixture charge is introduced through the intake valve IV, and a rich mixture charge is introduced through the intake valve 35 into the sub-combustion chamber S, with part of the rich mixture charge being introduced by way of the channel 54 to the central portion of the combustion chamber C. Meanwhile, exhaust gases are introduced from the main exhaust system through the exhaust-gas-leading pipe 2 and then through the synchronizing valve 21 into the sub-combustion chamber S, to be mixed with the aforesaid rich mixture charge. The mixture thus produced is introduced by way of channel 54 into the central portion of the combustion chamber C thereby creating an exhaust gas cloud therein. The exhaust-gas-leading pipe 2 is opened at a timing earlier than that of the intake valve IV in the course of the intake stroke, while the intake valve IV is closed upon completion of the intake stroke. When the piston P passes through the bottom dead center, the piston P begins ascending to enter the compression stroke. Exhaust gases which have been introduced through the exhaust-gas-leading pipe 2 are stratified in the central portion of the chamber, without diffusing throughout the chamber during time of compression to create an exhaust gas cloud. When a rich mixture charge is ignited by means of the spark plug SP positioned in the peripheral portion of the sub-combustion chamber S, the flame thus produced is injected through the channel 54 towards the central portion of the combustion chamber C to ignite and burn the exhaust gas cloud as well as the rich mixture cloud. Thereafter, the lean mixture charge in the peripheral portion of the combustion chamber C is completely burned. Since the concentration of exhaust gases in the peripheral portion of the combustion chamber C is low, both combustion temperature and propagation speed of the flame are high. As a result, the quantities of HC and CO are reduced, while the quantity of $NO_x$ is not increased. Also, the concentration of exhaust gases in the central portion of the combustion chamber is high, and the combustion temperature is low, so that production of $NO_x$ is suppressed. Furthermore, the ratio of surface area to volume, in the central portion of the combustion chamber is small, so that the quantities of HC and CO are not increased.

Figure 18:
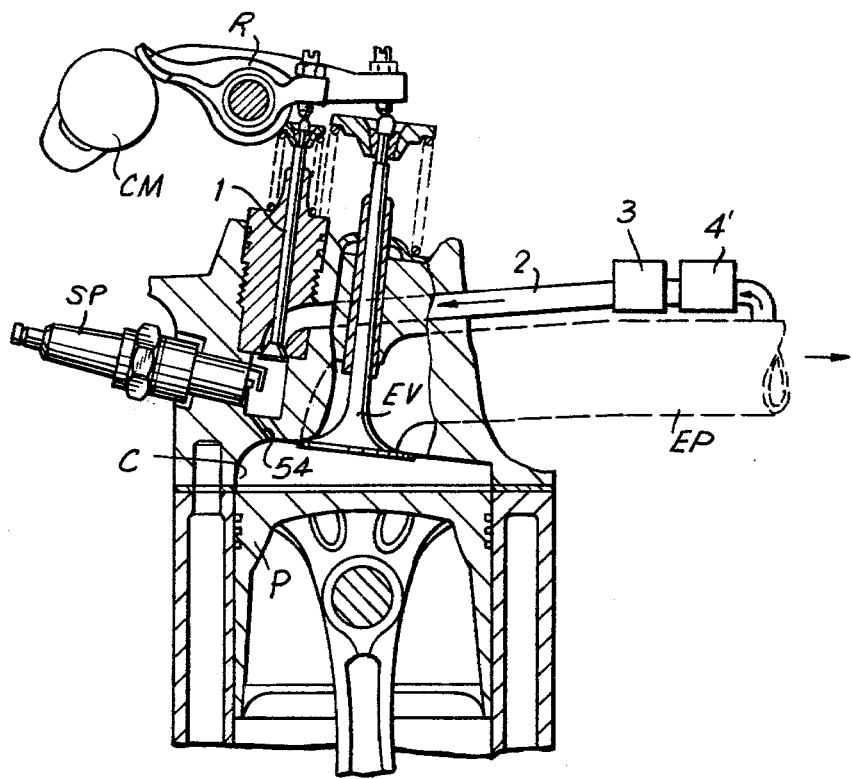
FIGS. 18 and 19 are longitudinal and transverse cross sectional views of the sixth embodiment of the invention.
Figure 19:
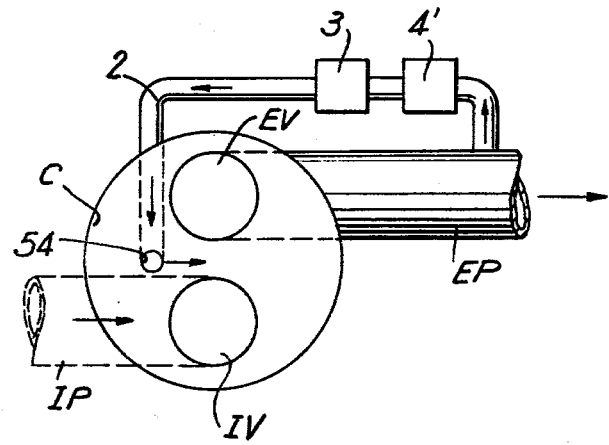

An internal combustion engine of the sixth embodiment of the invention is similar to those of the third and fifth embodiments; it is of the stratified charge type having a sub-combustion chamber. The difference is that as shown in FIGS. 18 and 19, the aforesaid sub-combustion chamber is provided with an exhaust gas intake valve 1 as valve means in place of intake valve 35 of the preceding embodiment so that an inflammable mixture supplied to the combustion chamber C may be fed to or from the sub-combustion chamber S through a channel 54. The upstream side of the sub-combustion chamber S is connected by way of control valve 3 throttle means and filter 4' with exhaust pipe EP of the main exhaust system by means of the exhaust-gas-leading pipe 2. In the internal combustion engine of the sixth embodiment, a spark plug SP is positioned on the side wall of the sub-combustion chamber S, which is positioned above the top, center portion of the combustion chamber C. The sub-combustion chamber S is connected by way of channel 54 with the central portion of the combustion chamber C.

In the operation of the sixth embodiment of the invention, at the final stage of the exhaust stroke, the piston P approaches the top dead center, and the intake valve IV is opened. As the piston P descends, the pressure in the combustion chamber C is lowered, whereupon a fresh inflammable mixture is introduced through the intake valve IV into the combustion chamber C, and exhaust gases are introduced from the exhaust system through filter 4', control valve 3 and exhaust gas intake valve 1, into the sub-combustion chamber S, and thence into the central portion of the combustion chamber C, thereby creating an exhaust gas cloud therein. The exhaust gas intake valve 1 is closed at a timing earlier than that of the intake valve IV in the course of the intake stroke, while the intake valve IV is closed upon completion of the intake stroke. When the piston P passes through the bottom dead center, then the piston P begins ascending to enter the compression stroke. Exhaust gases which have been introduced through the exhaust gas intake valve 1 are stratified in the central portion of the combustion chamber C, without diffusing throughout the chamber C during the compression stroke, thereby creating an exhaust gas cloud therein. The inflammable mixture charge in the combustion chamber C is introduced into the sub-combustion chamber S and ignited and burned by means of the spark plug SP positioned in the combustion chamber C. Even if a flame is injected through the channel 54 from the sub-combustion chamber, since the exhaust gas cloud exists in the combustion chamber, there will not take place a sudden burning, thus contributing to reduction of the quantity of $NO_x$ produced.

Since the concentration of exhaust gases in the peripheral portion of the combustion chamber C is low, there results a high combustion temperature and a high flame propagation speed. For this reason, the quantities of HC and CO produced are lowered, while the quantity of $NO_x$ is not increased. In addition, the concentration of exhaust gases in the central portion of the combustion chamber C is high and thus the combustion temperature is low, so that the production of $NO_x$ is suppressed.

In addition, the ratio of surface area to volume in the central portion of the combustion chamber C is small, so that the quantities of HC and CO are not increased.

Figure 20:
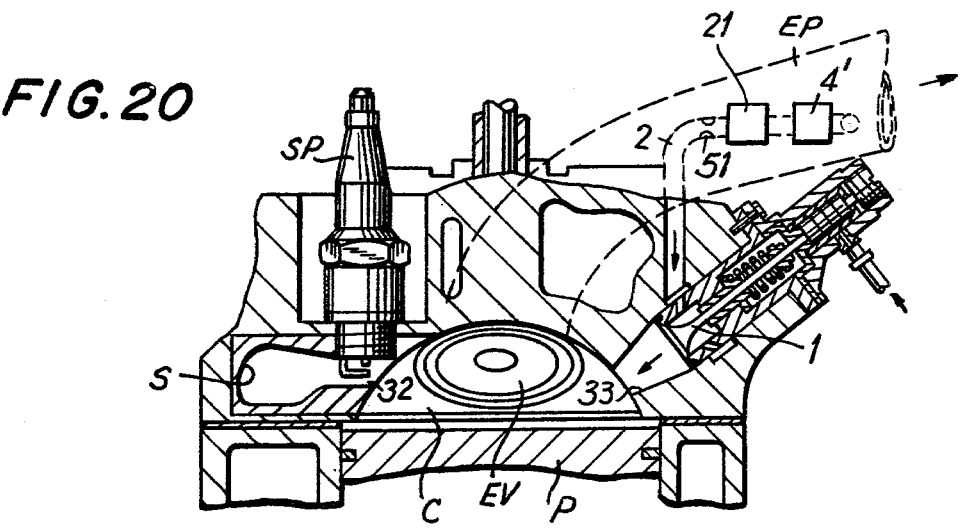
FIGS. 20 and 21 are longitudinal and transverse cross sectional views of the seventh embodiment of the invention.
Figure 21:
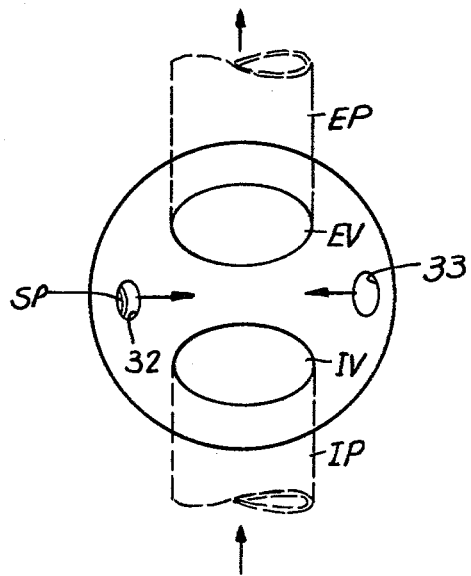

The internal combustion engine of the seventh embodiment of the invention differs from that of the sixth embodiment in that, as shown in FIGS. 20 and 21, a sub-combustion chamber S is positioned adjacent to the combustion chamber C of a hemi-spherical shape, in symmetric relation to an exhaust gas intake valve 1, with respect to the axis of the combustion chamber C. The aforesaid sub-combustion chamber S admits and discharges an inflammable mixture charge through a throttled channel 32 from and into the combustion chamber C. The aforesaid exhaust gas intake valve 1 as valve means communicates by way of an exhaust gas leading pipe 2 with the exhaust pipe EP of the main exhaust system through a throttle portion 51 of said pipe 2 and a synchronizing valve 21 as throttle means and filter 4' (as in the case of the second embodiment). The sub-combustion chamber S is provided with a spark plug SP on its side wall. In the internal combustion engine of the seventh embodiment, the opening of a hole 32 and the opening 33 of the exhaust-gas-leading pipe 2 are both directed towards the axis of the combustion chamber C. As illustrated, S may be roughly egg-shaped.

In the operation of the seventh embodiment of the invention, the exhaust gas intake valve is opened in the final stage of the exhaust stroke. When the piston P approaches the top dead center, the intake valve IV is opened, and as the piston P descends, the pressure in the combustion chamber C decreases, whereupon a fresh inflammable mixture charge is introduced through the intake valve IV, and exhaust gases are introduced from the main exhaust system through filter 4', synchronizing valve 21 and throttle portion 51, into the central portion of the combustion chamber C, thereby creating an exhaust gas cloud. The exhaust gas intake valve 1 is closed at a time earlier than that of the intake valve IV in the course of the intake stroke, while the intake valve IV is closed upon completion of the intake stroke. When the piston passes through the bottom dead center, then the piston P begins ascending to enter the compression stroke. However, exhaust gases which have been introduced through the exhaust gas intake valve 1 are stratified in the central portion of the combustion chamber C, without diffusing throughout the chamber C, thereby creating an exhaust gas cloud therein. During the compression stroke, the inflammable mixture charge in the combustion chamber C is introduced through a conduit 32 into the sub-combustion chamber S to be ignited and burned by means of spark plug SP, and the flame thus produced is injected through conduit 32 into the combustion chamber, thereby igniting and burning the exhaust gas cloud and the inflammable mixture charge in the combustion chamber C. Since the concentration of exhaust gases in the peripheral portion of the combustion chamber C is low, there result a high combustion temperature and a high propagating speed of a flame. For this reason, the quantities of HC and CO are reduced, and the quantity of $NO_x$ is not increased. On the other hand, the concentration of exhaust gases in the central portion of the combustion chamber C is high and thus the combustion temperature is low, so that the production of $NO_x$ is suppressed. In addition, the ratio of surface area to volume in the central portion of the combustion chamber C is small, so that the quantities of NC and CO are not increased.

Figure 22:
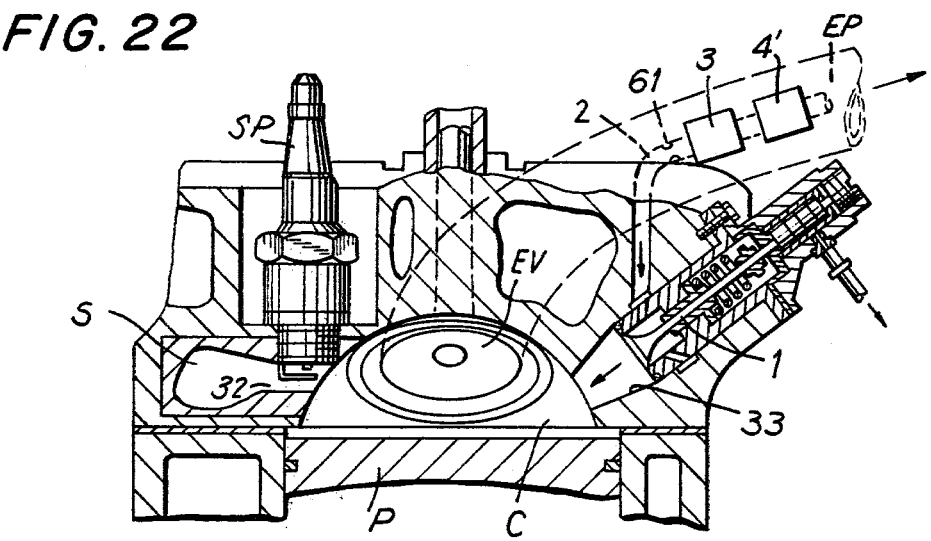
FIGS. 22 and 23 are longitudinal and transverse cross sectional views of the eighth embodiment of the invention.
Figure 23:
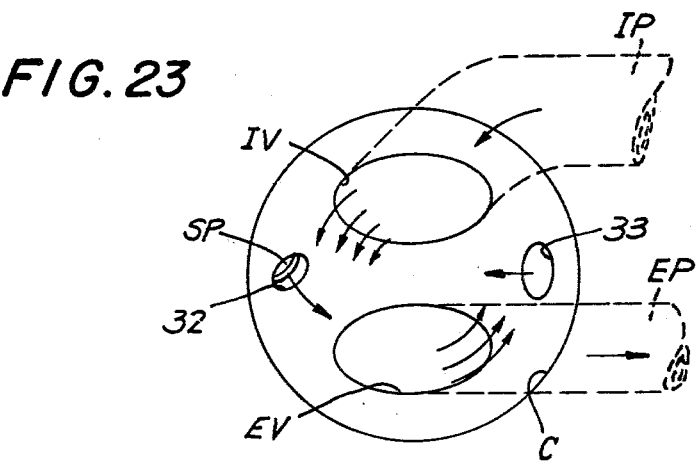

The eighth embodiment of the invention differs from the seventh embodiment in that, as shown in FIGS. 22 and 23, the opening of the channel 32 of the sub-combustion chamber is directed tangentially to the side wall of the combustion chamber C, and the intake pipe IP is also directed in the tangential direction so as to feed an inflammable mixture charge in a spiral pattern about the axis of the combustion chamber. The direction of the spiral flow of the inflammable mixture charge in the combustion chamber C coincides with the direction of a flame being injected through the channel 32 from the sub-combustion chamber S.

In the operation of the eighth embodiment of the invention, the exhaust gas intake valve 1 is opened in the final stage of the exhaust stroke. When the piston P approaches the top dead center, the intake valve IV is opened. As the piston P descends, the pressure in the combustion chamber C decreases and a fresh inflammable mixture charge is introduced through the intake valve IV, and exhaust gases are introduced from the exhaust valve IV, and exhaust gases are introduced from the exhaust pipe EP of the main exhaust system, through filter 4', control valve 3 and throttle portion 61 of pipe 2 (as in the case of the first embodiment), into the central portion of the combustion chamber C, thereby creating an exhaust gas cloud therein. The exhaust gas intake valve 1 is closed at a time earlier than that of the intake valve IV in the course of the intake stroke, while the intake valve IV is closed upon completion of the intake stroke.

When the piston P passes through the bottom dead center, the piston P begins ascending to enter the compression stroke. Exhaust gases which have been introduced through the exhaust gas intake valve are stratified in the central portion of the chamber, without diffusing throughout the chamber during the compression stroke, thereby creating an exhaust gas cloud therein. The inflammable mixture charge in the combustion chamber C is introduced through channel 32 into the sub-combustion chamber S during the compression stroke and ignited and burned by means of the spark plug SP and injected through the channel 32 into the combustion chamber, thereby igniting and burning the inflammable mixture charge and the exhaust gas cloud in the combustion chamber C. The channel is directed so that a flame injected therethrough contacts with and goes along the wall surface of the combustion chamber C, following the spiral pattern. Since the wall surface of the combustion chamber is covered by the flame the production of the inflammable mixture charge in the peripheral portion is burned completely, and CO and HC are suppressed. Since in the central portion of the combustion chamber C an exhaust gas cloud is created, the combustion temperature is lowered and the quantity of $NO_x$ is reduced to a large extent. As aforenoted, during the compression stroke, the mixture charge in the combustion chamber C is introduced into the sub-combustion chamber S. The channel 32 is directed along the wall surface of the chamber, so that a mixture charge containing a high concentration of exhaust gases is not introduced into the sub-combustion chamber S. In addition, even if the quantity of exhaust gases introduced through the exhaust gas intake valve 1 is increased, there results no increase in the concentration of exhaust gases within the sub-combustion chamber S, nor impaired combustion of a lean mixture charge.

The internal combustion engine of the ninth embodiment of the invention is a diesel engine (compression ignition engine) as shown in FIGS. 24 to 26A and 26B. A preliminary combustion chamber $S_1$ (a swirl chamber or air chamber which will be referred to as a sub-chamber hereinafter) is positioned in the top wall portion of the combustion chamber C in symmetric relation to an exhaust-gas-leading pipe 2 as valve means, with respect to the axis of the chamber C, so as to be connected through a conduit 60 with the combustion chamber C. Said exhaust-gas-leading pipe 2 has a throttle 61, a control valve 3 as throttle means and filter 4' and is opened or closed by means of an exhaust gas intake valve 1. The opening of the conduit 60 and the opening of the exhaust-gas-leading pipe 2 are opposed with each other and are directed to the axis of the combustion chamber C, thereby creating an exhaust gas cloud in the central portion of the combustion chamber C. The exit of a fuel injection valve 62 faces the sub-chamber $S_1$, and is connected by a fuel injection pump (not shown) with a fuel supply source, for supplying a given amount of fuel into the combustion chamber C at a given timing of the internal combustion engine. In addition, the exhaust gas intake valve 1 is interposed between the exhaust-gas-leading pipe 2 and the combustion chamber C. The upper portion of the exhaust gas intake valve 1 is connected with a hydraulic drive means 34 as in the third embodiment, and thus the valve 1 is opened or closed by hydraulic pressure supplied from the means 34. The upstream side of the exhaust gas leading pipe 2 is connected by way of a throttle portion 61 and filter 4' with the exhaust pipe EP of the main exhaust system, as in the preceding embodiments. Unlike the spark ignition type engine, an ordinary diesel engine having a sub-chamber produces a noise called a diesel knock. This diesel knock is produced due to the sudden pressure rise which is produced when gases ignited in the sub-chamber are injected into the combustion chamber C and then burned suddenly. In the internal combustion engine of this ninth embodiment of the invention, such a sudden combustion may be prevented since an exhaust gas cloud is created in the central portion of the combustion chamber C. Therefore, the noise or knock as well as the quantity of $NO_x$ produced are reduced.

Figure 26A:
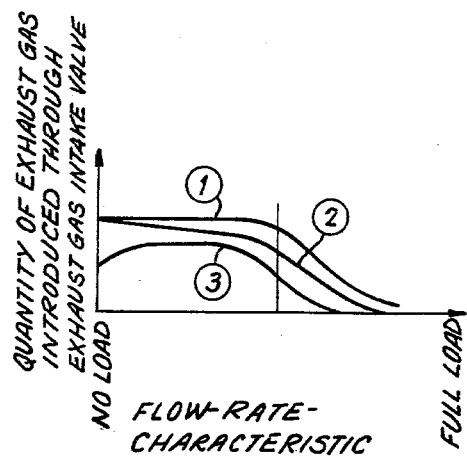

The operation of the exhaust gas intake valve is similar to that in the case of the spark ignition type internal combustion engine. However, adjustment of a diesel engine of the ninth embodiment to variation in load is effected by controlling only the quantity of fuel being injected and the ignition is performed due to spontaneous firing, so that the quantity of intake air is not small even when idling. As a result, the concentration of $NO_x$ in the exhaust gases during idling will be increased, compared with that of the spark ignition type engine which adjusts the load by throttling the quantity of air, since the quantity of intake oxygen to be combined with nitrogen is large. For this reason, unlike the first embodiment as shown in FIG. 4, exhaust gases should be introduced through the intake valve 1 even at no-load condition. This also aids in the reduction of the knock at no-load condition. FIG. 26A represents the relationship between the quantity of exhaust gases introduced through the exhaust gas intake valve and the flow rate characteristics. If exhaust gases are introduced into the combustion chamber at a high load condition, a black smoke is produced so that the exhaust gas intake valve 1 should not be operated at a high load condition. The way to drive the exhaust gas intake valve and the flow-rate-adjusting method are the same as with the spark ignition type internal combustion engine in the preceding embodiments. Referring to FIG. 26A, curve (1) represents the exhaust-gas-flow-rate characteristic of an internal combustion engine of the type in which the quantity of $NO_x$ is reduced in the low speed range, curve (2) represents the exhaust-gas-flow-rate-characteristic of an internal combustion engine of an average type, in which the quantity of $NO_x$ is reduced throughout the range from no load to a full load, and curve (3) represents the exhaust-gas-flow-rate-characteristic of an internal combustion engine, in which the quantity of $NO_x$ is reduced at a high load.

Figure 24:
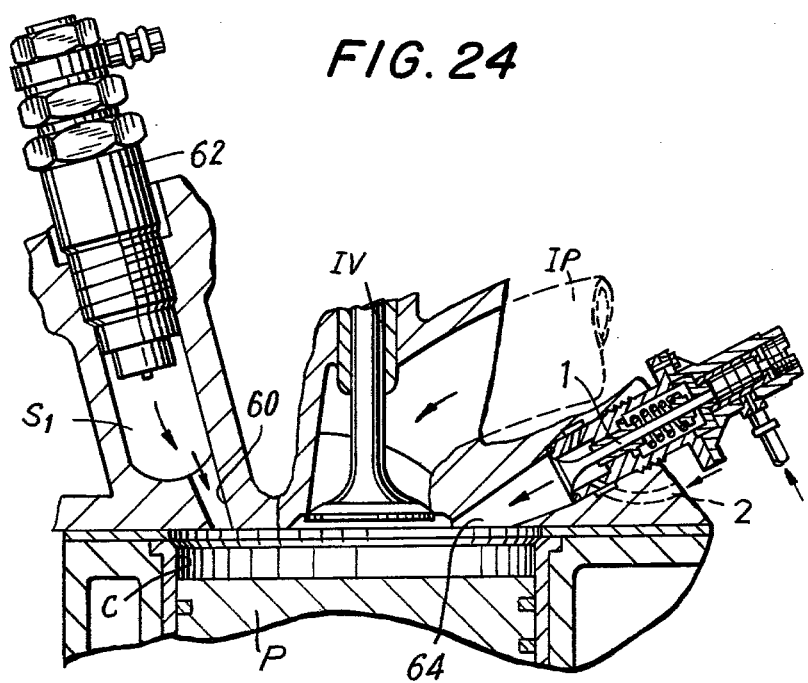
FIGS. 24 to 26 are longitudinal and transverse cross sectional views of the ninth embodiment of the invention.
Figure 25:
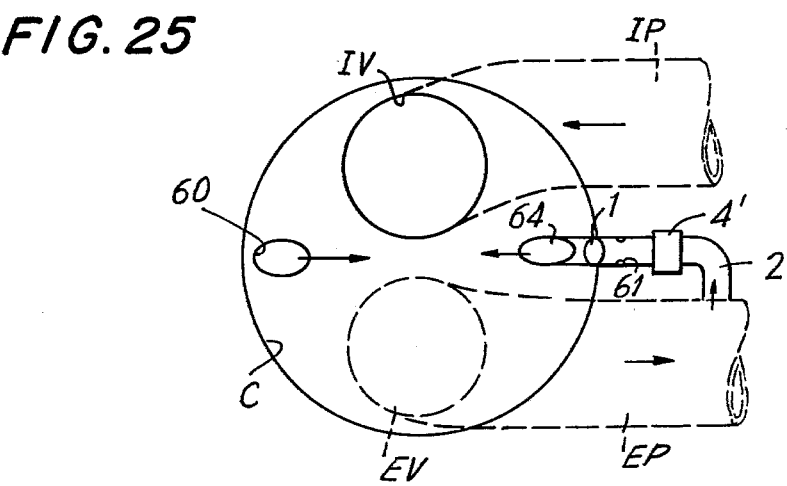
Figure 26B:
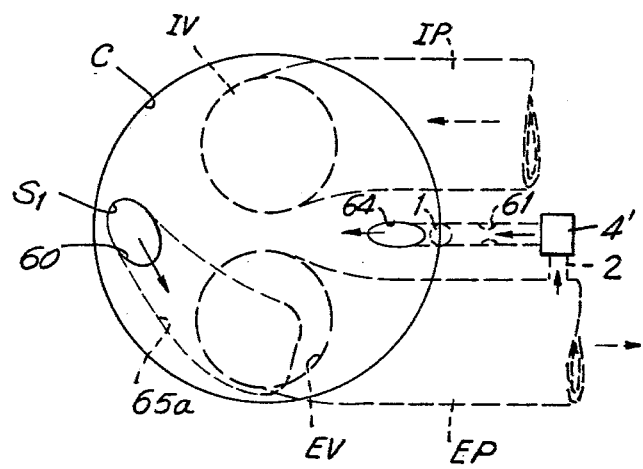

In the internal combustion engine of the ninth embodiment, the position of the exhaust gas intake valve need not necessarily be limited to that shown in FIG. 24, but may be positioned on the side wall of the sub-chamber $S_1$ between the fuel injection valve 62 and the conduit 60. On the other hand, as shown in FIG. 26B, the opening of the conduit 60 in the sub-chamber $S_1$ may be directed in the tangential direction to the combustion chamber C, said direction coinciding with that of the intake air stream through the intake valve IV. A diverging groove 65a may be provided in the top surface of the piston in the tangential direction thereof so that said groove receives the flame from the sub chamber S. Such a modification may reduce the quantities of CO and HC, presenting the same results as that obtained from the ninth embodiment.

Figure 27:
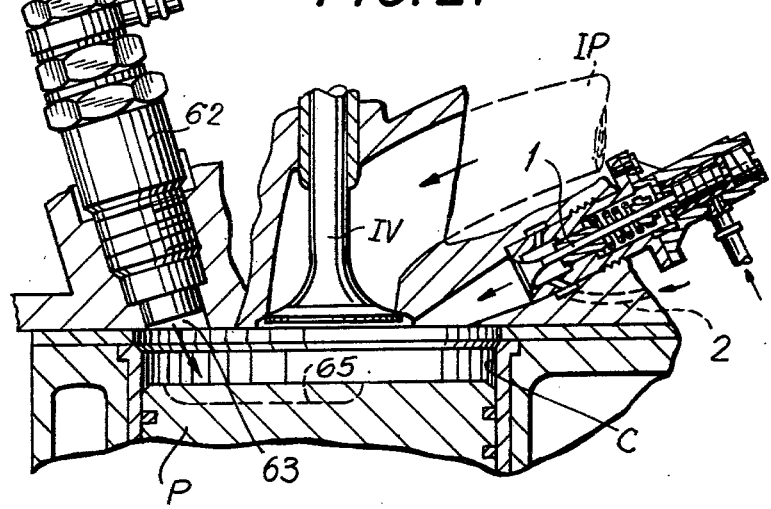
FIGS. 27 and 28 are longitudinal and transverse cross sectional views of the tenth embodiment of the invention
Figure 28:
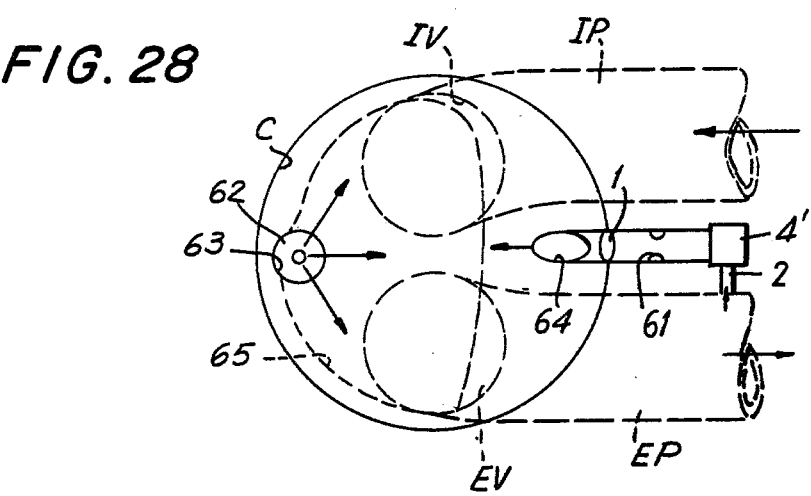

The internal combustion engine of the tenth embodiment is also a diesel engine but differs from the engine of the ninth embodiment in that fuel is directly injected into a combustion chamber, as shown in FIGS. 27 and 28. Nozzle 63 of fuel injection valve 62 leads directly into the combustion chamber C. The top flat face of the piston P is provided with a diverging groove 65 so as to receive fuel injected through nozzle 63 of the fuel injecting valve 62. Exhaust nozzle 64 positioned at the opening of exhaust-gas-leading pipe 2 has an opening directed towards the axis of the combustion chamber C. The exhaust-gas-leading pipe 2 has a throttle 61 as throttle means, and filter 4'. The other arrangements of the tenth embodiment are the same as those of the ninth embodiment, so that like reference numerals are given to like elements and the explanation of the construction is omitted.

As aforenoted with respect to the diesel engine of the ninth embodiment, in the diesel engine of an ordinary direct-injection type, there takes place a noise called diesel knock. This is due to the fact that fuel which has been injected into the main combustion chamber is fired simultaneously after a firing time lag so that the pressure rises rapidly and said noise is produced. According to the internal combustion engine of the tenth embodiment, sudden burning may be prevented by the presence of an exhaust gas cloud created in the central portion of the combustion chamber, so that the noise (knock) as well as the production of $NO_x$ may be reduced.

The operation of the exhaust gas intake valve 1 is similar to that of the spark-ignition-type engines of the preceding embodiments. However, in the diesel engine of the tenth embodiment, adjustment is made for load variation by controlling only the amount of fuel being injected, and the fuel is ignited by the spontaneous firing, so that the quantity of intake air is not small even during idling. As a result, the concentration of exhaust gases ($NO_x$) during idling will be increased compared with that of the spark ignition type engine, which adjusts a load by throttling the quantity of air, since the quantity of intake oxygen to be combined with nitrogen within the exhaust gas is large. For this reason, exhaust gases must be introduced through the exhaust gas intake valve even at no-load condition. By introducing exhaust gases, the knock at no-load condition may be reduced as well. In case exhaust gases are introduced at a high load condition, black smoke is produced, so that the exhaust gas intake valve 1 should not be operated at a high load. The way to drive the exhaust-gas-intake valve and the flow-rate-adjusting method are the same as with the spark ignition type internal combustion engine of the preceding embodiments.

In summary, the present invention provides a stratified charge type combustion process wherein an inflammable mixture charge of air and fuel, which are fed into a combustion chamber of said internal combustion engine, is ignited and burned, said process being characterized in that said process comprises the steps of:

supplying a given quantity of exhaust gases into the central portion of said combustion chamber during the intake stroke in a manner such that said exhaust gases stay in the central portion of said combustion chamber rather than diffuse throughout said combustion chamber;

forming a region containing a high concentration of exhaust gases in the central portion of said combustion chamber, and another region containing an inflammable mixture charge in a manner to encompass said central region thereby providing a stratified charge during the compression stroke; and igniting said inflammable mixture charge during the combustion stroke for burning said stratified charges of said inflammable mixture charge and said exhaust gases.

The present invention further provides an internal combustion engine wherein an inflammable mixture charge of air and fuel, which is fed into a combustion chamber of said internal combustion engine, is ignited and burned, said engine being characterized in that said engine comprises:

an opening in the wall of said combustion chamber which is directed towards the axis of said combustion chamber;

an exhaust gas supply passage communicating with an exhaust gas passage and discharging the exhaust gases from outside into said opening;

valve means located in said exhaust gas supply passage and controlling the communication of said combustion chamber with said exhaust gas passage during the intake stroke; and throttle means positioned in said exhaust gas supply passage for supplying a given quantity of exhaust gases to the combustion chamber, whereby during the intake stroke, said inflammable mixture charge is supplied into said combustion chamber, and said exhaust gases of a given quantity is supplied to the central portion of said combustion chamber; during the compression stroke, there are created a region containing a high concentration of exhaust gases in the central portion of said combustion chamber, and another region containing said inflammable mixture charge in a manner to encompass said central region therewith, followed by stratification of same; and during the combustion stroke, said inflammable mixture charge is ignited for burning stratified charges of said exhaust gases and said inflammable mixture charge.

The present invention further provides an internal combustion engine utilizing a stratified charge of air and fuel, which is fed into a combustion chamber of said internal combustion engine, is ignited and burned, said engine being characterized in that said engine comprises:

an opening in the wall of said combustion chamber and which is directed towards the axis of said combustion chamber;

an exhaust gas supply passage communicating with an exhaust gas passage and discharging exhaust gases from outside into said opening;

valve means located in said exhaust gas supply passage and controlling so as to allow the communication of said combustion chamber with said exhaust gas passage during the intake stroke; and throttle means located in said exhaust gas supply passage and controlling its opening, in accordance with r.p.m., load, and boost pressure of said internal combustion engine, for supplying a given quantity of exhaust gases therethrough;

whereby during the intake stroke, said inflammable mixture charge is supplied into said combustion chamber, and said exhaust gases of a given quantity are supplied to the central portion of said combustion chamber; during the compression stroke, there are created a region containing a high concentration of exhaust gases in the central portion of said combustion chamber, and another region containing said inflammable mixture charge in a manner to encompass said central region therewith, to stratify them; and during the combustion stroke, said inflammable mixture charge is ignited for burning stratified charges of said exhaust gases and said inflammable mixture charge.

As is apparent from the foregoing, the present invention provides advantages in reducing the quantity of $NO_x$ alone, without the accompanying increase in the quantities of HC and CO, or an increase in fuel consumption, yet without lowering the super-lean-combustion-limit-air-fuel-ratio.

In addition, the stratified charge type combustion process for an internal combustion engine and the internal combustion engine using same are by no means limited to the embodiments shown herein.

For instance, according to the preceding embodiments, the internal combustion engine according to the present invention is applied to a spark ignition type internal combustion engine having a carburetor and to a diesel engine. However, the present invention is by no means limited to these types of internal combustion engine but to other spark ignition type internal combustion engines having a fuel injection valve for gasoline as follows:

(a) For a spark ignition type internal combustion engine, in which an exit of a fuel nozzle faces an intake pipe, and gasoline is injected into an intake opening of a combustion chamber; the internal combustion engines of the first to tenth embodiments of the invention may be used, irrespective of the provisions of the exhaust gas intake valve or exhaust-gas-leading pipe.

(b) For a spark ignition type internal combustion engine of a fuel injection type, which injects gasoline into a sub-chamber; a gasoline injection nozzle is positioned within a sub-chamber as shown in the ninth and tenth embodiments, while the exhaust gas intake valve may be the same as of the seventh and eighth embodiments shown in FIGS. 20 and 23.

(c) For a spark ignition type internal combustion engine of the type in which gasoline is directly injected into a combustion chamber; the internal combustion engine according to the present invention may be applied, as far as the nozzle exit of exhaust gas intake valve or the exhaust gas leading pipe is directed towards the axis of a combustion chamber, irrespective of the position and fuel injection direction of a fuel injection valve. This type of the internal combustion engines, includes Texaco or Witzky types, in which fuel is injected into swirling air within the combustion chamber in the same direction or opposite direction of the aforesaid swirling air, whereby a mixture of a swirling flow is supplied to a flame surface, and combustion may take place at the same speed as that of the formation of the flame surface; a PROCO type in which a swirling flow is forcibly formed by means of a stationary shroud of a valve seat portion during the intake stroke, fuel is supplied through an injection nozzle at the final stage of the compression stroke, a rich mixture charge in the vicinity of the injection valve is ignited, and the mixture with swirling air is burned within a cone-shaped cup in the top portion of a piston; Newhail type, Hesseleman type, Ricardo type, Broderson type, Schlamann type, Heintz type and the like.

Figure 29A:
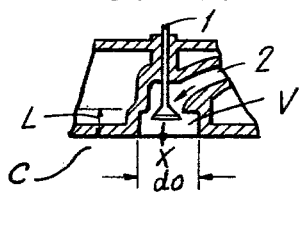

In addition, the position, flow rate, shape and the like of the exhaust gas intake valve and exhaust-gas-leading-pipe should not necessarily be limited to these embodiments shown. For instance, various embodiments as shown in FIGS. 29A and 29F may be used. But, if as shown in FIG. 29C the exhaust gas intake valve faces the combustion chamber C directly it is difficult to form an exhaust gas cloud. The embodiments shown in FIGS. 29A and 29B are preferable for good results.

Figure 29B:
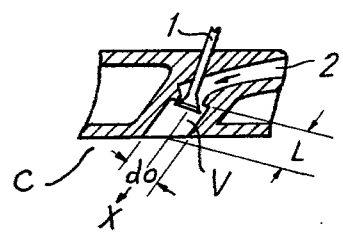
Figure 29C:
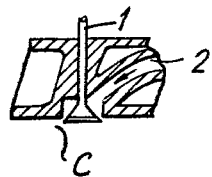

FIG. 29A and FIG. 29B show holes or concave portions provided in the wall of the combustion chamber so as to guide exhaust gases from or into the chamber. The cross section of the hole should preferably be circular. However, other configurations of the cross section may be used. The diameter do and the depth L of the concave portion should preferably be such that $L > 0.5$ do, most preferably 1 do $< L$ ($< 2.5$ do). The upper limit of the depth of the concave portion is determined from design considerations since the compression ratio is lowered as the volume (V) of the concave portion is increased. The average cross-section $A_o$ of the hole or concave portion having the diameter do preferably ranges from 0.2 to 9% of the cross-section A of the cylinder bore of the engine. If the diameter is too small, carbon deposit can easily clog the concave portion, and it is difficult to arrange the exhaust gas intake valve. If the diameter is too large, the exhaust gases tend to diffuse and it is difficult to form an exhaust gas cloud.

Figure 29D:
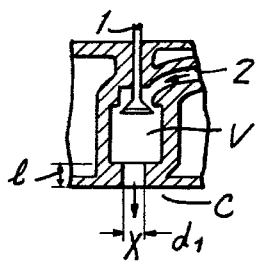
Figure 29E:
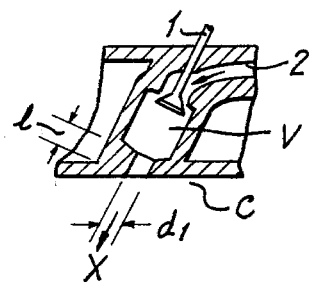
Figure 29F:
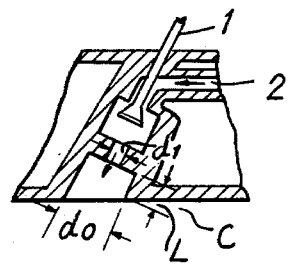
Figure 29G:
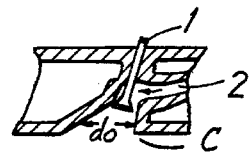
Figure 29H:
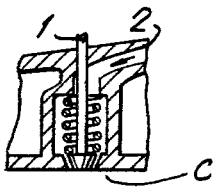

In an example shown in FIG. 29G provided with a diverging concave portion do denotes the average diameter. In case a concave portion of large do cannot be provided from design considerations, such concave portions as shown in FIGS. 29D to 29F may be used. In these cases, the diameters $d_1$ of the exit of the exhaust gas nozzle is the same as the diameter do of the concave portion.

In addition, the volume V of the concave portion is related to the compression ratio and does not affect the formation of an exhaust cloud.

Figure 30A:
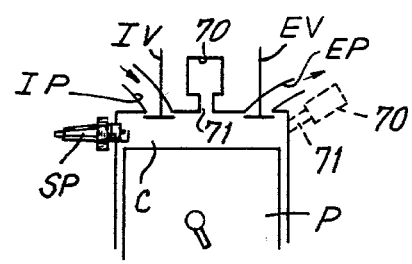

FIG. 30A shows another example, in which a concave portion 70 having no valve means, no throttle means, and no exhaust gas supply passage (shown by a solid line) is positioned in the central portion of the combustion chamber C so as to communicate therewith, and as shown by the broken line, there may be suggested an example in which an exhaust nozzle 71 is open from the side wall of the combustion chamber and directed towards the axis of the chamber. In this case, there takes place a pressure difference between the concave portion 70 and the combustion chamber C due to descending of a piston, after ignition of a mixture in the peripheral portion of the combustion chamber C, so that exhaust gases (residual gases) compressed in the concave portion during the exhaust stroke are injected into the combustion chamber C during the intake stroke, thus presenting advantages similar to those obtained in the preceding cases. (Part of a mixture charge enters the concave portion during the compression stroke and burning of the mixture takes place therein due to flame from the combustion chamber). According to this modification the quantity of $NO_x$ is not so reduced as in the case where the $NO_x$ is positively controlled by means of the exhaust gas intake valve, but this can be put into practical application. The volume of the concave portion should preferably range from 20 to 30% of the volume of the combustion chamber, when the piston is positioned at the top dead center.

In the case of a spark-ignition type internal combustion engine, the quantity of exhaust gases introduced into the combustion chamber through the exhaust gas intake valve is up to 20% of the quantity of the intake air, depending on operating conditions. However, the higher the flow rate, the lower will be the concentration of $NO_x$ and the lower will be an engine torque. Therefore, the practical range of the quantity of exhaust gases is from 3 to 12% of the intake air. In the case of a compression ignition engine (diesel engine) the permissible range of the exhaust gas is up to about 50% of the quantity of the intake air and the practical range thereof is from about 3 to 25%.

Figure 30B:
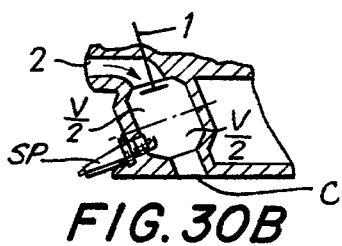

Furthermore, in case an exhaust gas intake valve is provided within the sub-combustion chamber S or $S_1$ as shown in FIG. 30B, the volume of the sub-combustion chamber S is determined only in accordance with the requirements arising from combustion. The concentration of exhaust gases in the sub-combustion chamber is high at the time of ignition, as compared with the case where the exhaust gas intake valve is not used, so that the combustion speed is somewhat low and even if the volume is increased, there will not be produced a noise. Therefore, the volume of the sub-combustion chamber S should range from 2 to 15% of the volume of the cylinder with the piston at the top dead center in a spark ignition type engine. It is required that the spark plug SP be positioned within that half V/2, of the volume of sub-combustion chamber V on the side of the exhaust nozzle, and that the exhaust gas intake valve be positioned within that half V/2, of the aforesaid volume V on the side opposite to the aforesaid side. (The deepest portion of the chamber is preferable).

Figure 31:
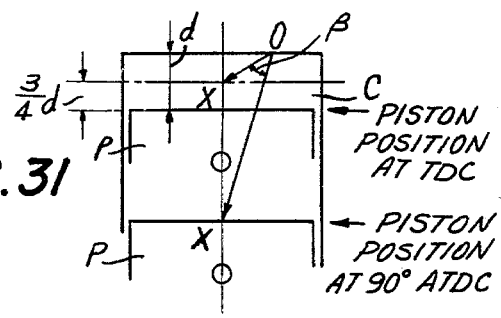
FIGS. 31, 32 and 33 show preferred directions for injection of exhaust gas to form an exhaust gas cloud.
Figure 32:
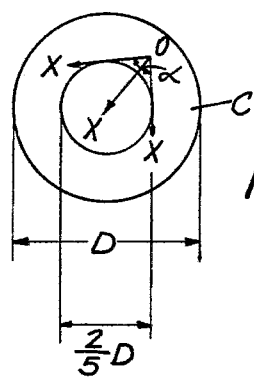
Figure 33:
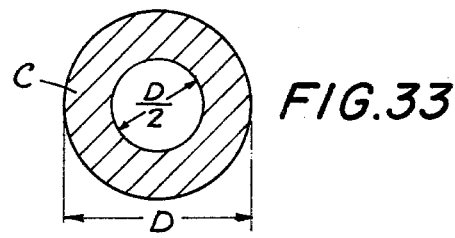

The examples shown in FIGS. 29A to 29F are applicable to the case where the exhaust-gas intake valve is provided in the combustion chamber C rather than in a sub-combustion chamber. Where the exit of the exhaust nozzle is positioned in the top central portion of the chamber as shown in FIGS. 31 and 32, the direction X of exhaust gases being injected through an opening into the combustion chamber, should pass through the point below the top central portion of the combustion chamber. Where the exit of the nozzle is not positioned in the central portion of the chamber, the direction X of the nozzle in the vertical plane should range through an angle which is formed between a line from the exit O of a nozzle to the point positioned at a distance of $\frac{2}{3}$d from the center of the top face of the piston P when at the top dead center, and a line from the exit O of the nozzle to the center of the top face of the piston P when positioned at ATDC 90°, as shown in FIG. 31. (In this respect, 'd' represents the distance from the top face of the piston P to the top wall of the chamber, when the piston is positioned at TDC). The injecting direction X of the nozzle in the horizontal plane should range through an angle $\alpha$ between two circumscribing tangential lines running from the exit O of the nozzle to a circle having a diameter 2/5 D, where the diameter of the cylinder is D, as shown in FIG. 32. In case the spark plug SP is positioned in the combustion chamber C, in the absence of a sub-chamber, one or two spark plugs should be positioned in the hatched portion ranging from the diameter of D/2 to the diameter D of the cylinder as shown in FIG. 33. With regard to the configuration of the combustion chamber C, a squish type of combustion chamber wherein exhaust gases tend to diffuse, lowers the effect of exhaust gases cloud. The preferable configurations of the combustion chamber C are a disk form (FIG. 34A), hemi-spherical form (FIG. 34B), and other configurations shown in FIGS. 34C to 34F. In FIGS. 34B to 34F, the distance from a point on the top wall of the chamber to the point of the piston face immediately below is a maximum near the the axis of the cylinder.

The configurations and arrangements of the intake pipe IP, through which an intake mixture or intake air is supplied into the combustion chamber C (FIGS. 35A to 35E), do not make any substantial difference in the reduction of the quantity of $NO_x$ alone, due to the effect of an exhaust cloud. However, the embodiment of FIG. 35C is somewhat inferior, because the intake gases tend to blow through the central portion of the combustion chamber C. In case a swirl flow is desired in the combustion chamber, examples shown in FIGS. 35A, B, D, E take good effects. According to the example shown in FIG. 35D, wherein a shroud is provided for the intake valve, the example shown in FIG. 35E wherein an intake pipe IP is bent, the reduction of quantities of HC, CO and $NO_x$ will be further enhanced, because the swirl flow is easily produced. However, since the flow resistance of said bent pipe is high, the volumetric efficiency will be lowered, with an accompanying slight lowering in output power. However, this can be put into the practical application.

With regard to the piping system of a multiple cylinder type internal combustion engine, one exhaust intake valve and one exhaust-leading-pipe diverging from the main pipe should be provided for each cylinder. The drive system of exhaust gas intake valve and the flow rate control system is grouped into the following two classes:

(a) In case the exhaust gas intake valve 1 is cam-driven by means of the rocker arm of the intake valve IV:

As shown in FIG. 36, a throttle portion and a control valve 3 are provided in the exhaust-gas-leading pipe, to operate the on-off control and the flow rate control of exhaust gases flow, for enabling the opening and closing operation of the exhaust gas intake valve at all times. In a four-cylinder type internal combustion engine, with the flow rate of exhaust gases being constant, only on-off control of exhaust gas flow functions the same system as above and allows practical application. Needless to say, the control valve may be replaced by an electro-magnetic type.

(b) In case the exhaust gas intake valve 1 is driven by a hydraulic valve drive means:

As shown in FIG. 37, by means of the hydraulic rotary distribution valve which controls the lifting of an exhaust gas intake valve or the lifting phase of the valve, said valve is opened or closed hydraulically and said pipe is provided with a throttle portion and connected to an exhaust pipe EP which communicates with the sub-combustion chamber S of a multiple cylinder type engine intermittently. Furthermore, for practical application, the introduction and interruption of exhaust gases may be controlled for each cylinder, while the exhaust gas intake valve may be opened or closed by means of a solenoid provided in the rotary member rotating in synchronism with the engine.

The passage-opening-and-closing-control-means and throttle means for controlling the quantity of exhaust gases and the timing of supply thereof as used in the preceding embodiments should not necessarily be limited to the control valve 3 and 40, synchronizing valve 21, hydraulic valve drive means 34, and throttle portion 51 and 61, but may be a control valve using a centrifugal governor, or control valve using an intake-pressure governor. It should be noted, however, that by those skilled in the art various combinations of these components may be selected to suit for various type internal combustion engines.

The supply means of exhaust gases into the central portion of the combustion chamber, besides the foregoing embodiments, may be modified such that the opening timing of the exhaust valve EV itself is varied by means of a variable mechanism such as a cam or rocker arm of a modified form. In addition, a valve seat exhaust valve EV may be provided with an exhaust-gas-guide passage which is directed towards the axis of the combustion chamber.

In the use of the term stratified charge, it is recognized that sharp stratification, such as is observed with respect to undisturbed strata in the earth, does not occur in a combustion chamber. The reason is that some intermingling must occur at boundary surfaces between the charge of exhaust gas plus inflammable mixture on the one hand and inflammable mixture on the other. In addition some mixing by diffusion must occur. However, both the intake stroke and the compression stroke are so rapid that mixing between the two charges is minimized. It is therefore justified to refer to a stratified charge, even though it might be more precise to refer to regions of higher and lower concentration of the various components, and, in particular, of the exhaust gases.

Furthermore in describing the entry of the inflammable charges as being along a helical path, it is extended that this term shall also include a spiral path.

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. A stratified charge type combustion process for an overhead valve type of an internal combustion engine, wherein an inflammable mixture of air and fuel supplied into a combustion chamber of said internal combustion engine is ignited and burned, comprising the steps of
   supplying an inflammable mixture into a peripheral portion of a combustion chamber during an intake stroke in order to make said inflammable mixture stay in said peripheral portion of said combustion chamber,
   supplying exhaust gases into a central portion of said combustion chamber during said intake stroke, independently of said inflammable mixture, in order to make said exhaust gases stay in said central portion of said combustion chamber without diffusing throughout said combustion chamber,
   forming a region containing a high concentration of exhaust gases in said central portion of said combustion chamber and another region containing said inflammable mixture charge in a manner to encompass said region therewith within said combustion chamber during a compression stroke of said engine,
   thereby providing stratified charges of said one region of said exhaust gases and another region of inflammable mixture charge, and igniting said inflammable mixture charge by ignition means and burning said stratified charges of said exhaust gases and inflammable mixture charge so as to make the combustion proceed from the peripheral portion of said combustion chamber to the central portion thereof.

2. A stratified charge type internal combustion engine of the overhead valve type wherein an inflammable mixture charge of air and fuel may be supplied to a combustion chamber of said internal combustion engine, comprising
   an opening means opening into a central portion of the combustion chamber, and being directed towards the axis direction of said combustion chamber for supplying exhaust gases into said central portion,
   an exhaust gas passage,
   an exhaust gas supply passage communicating with said exhaust gas passage which exhausts the exhaust gases from said combustion chamber, and with said opening means, for supplying said exhaust gases from said exhaust gas passage to said opening means,
   valve means including a valve member, said valve means being arranged for controlling opening or closing of said valve member so as to allow the communication of said opening means with said exhaust gas passage during an intake stroke of said engine, said valve means being located in said exhaust gas supply passage,
   throttle means for supplying a predetermined quantity of said exhaust gases to said opening means, said throttle means being located in said exhaust gas supply passage,
   intake valve means for supplying an inflammable gas mixture to the peripheral portion of said combustion chamber, and
   ignition means for igniting said inflammable mixture so as to make the combustion proceed from the peripheral portion of said combustion chamber to the central portion thereof, whereby an inflammable mixture is supplied to said peripheral portion of said combustion chamber and independently of said inflammable mixture exhaust gases are supplied to said central portion of said combustion chamber during an intake stroke of said engine so as to make said exhaust gases stay in said central portion of said combustion chamber without diffusing throughout said combustion chamber, the purpose being to form stratified charges consisting of a region containing a high concentration of exhaust gases in said central portion of said combustion chamber and another region containing said inflammable mixture charge in a manner to encompass said exhaust gas region therewith within said combustion chamber during the compression stroke of said engine, in preparation for igniting said inflammable mixture charge by said ignition means, and burning said stratified charges of said exhaust gases and said inflammable mixture.

3. A stratified charge type internal combustion engine according to claim 2, wherein
said throttle means for supplying a predetermined quantity of said exhaust gases to said opening is arranged and constructed to control the throttle setting thereof in accordance with at least one of the revolution, load and boost pressure of said internal combustion engine.

4. A stratified charge type internal combustion engine according to claim 2, wherein
said opening means comprises
an opening hole opening within said combustion chamber,
said valve member of said valve means having a valve head and being disposed within said opening hole in said combustion chamber so as to reciprocate therein,
thereby intermittently forming the opening between said opening hole and said valve member.

5. A stratified charge type internal combustion engine according to claim 4, wherein
said combustion chamber is defined by a concave wall having a bottom portion, and
said opening hole is provided at said bottom portion of said concave wall.

6. A stratified charge type internal combustion engine according to claim 5, wherein
the cross-sectional area of the space formed by said concave portion gradually increases from the opening part of said concave portion connected to said combustion chamber to said bottom portion of said concave portion in which said valve member is provided.

7. A stratified charge type internal combustion engine according to claim 5, wherein
the average diameter do and the depth L of said concave portion have a relation as follows:

$L > 0.5\ do.$

8. A stratified charge type internal combustion engine according to claim 7, wherein said engine has a cylinder, and
said average diameter do and depth L of said concave portion have a relation as follows:
$do < L < 2.5\ do.$ 9. A stratified charge type internal combustion engine according to claim 8, wherein
the average cross section Ao of said concave portion and the cross section A of the cylinder bore of said engine have a relation as follows:

$0.002\ A < Ao < 0.09\ A.$

10. A stratified charge type internal combustion engine according to claim 9, wherein
said throttle means is arranged and constructed to supply a predetermined amount $V_E$ of said exhaust gases having the following ratio to the amount $V_I$ of any inflammable mixture introduced into said combustion chamber:

$0.03\ V_I < V_E < 0.12\ V_I.$

11. A stratified charge type internal combustion engine according to claim 10, further comprising an ignition plug and a piston having a top surface in said cylinder and wherein
the axial direction of said opening ranges through an angle between a line from said center of said opening means to a point positioned at a distance of $\frac{3}{4}$ d from the center of the top face of the piston when positioned at top dead center, d being the distance between the upper surface of said combustion chamber and said top face of said piston at top dead center and a line from the center of said opening means to the center of the top face of said piston when positioned at 90 degrees after top dead center, in vertical plane, and ranges through an angle between two circumscribing tangential lines running from the center of said opening means to a circle having a diameter (2/5) D, D being the diameter of the cylinder bore of said engine, and
said ignition plug for igniting an introduced inflammable mixture charge being positioned in a region between a circle of a diameter D/2 and a circle of a diameter D.

12. A stratified charge type internal combustion engine according to claim 11, comprising a crank shaft in said engine and a cam shaft operatively connected with said engine for being synchronously driven thereby and, wherein
said valve means comprises
a hydraulic valve drive means comprising
a pump means for providing a fluid under pressure,
said pump means being synchronously driven by said crank shaft of said engine,
a fluid supply passage for supplying said fluid under pressure from said pump means,
a valve lifter comprising a cylinder connected to said fluid supply passage,
a valve member having a spring means and a valve head provided at said spring means,
a piston is disposed within said cylinder and connected to said valve member, and
said throttle means comprises a synchronizing valve connected to said opening means comprising
a case body disposed at said engine,
a rotary disc having an arcuate slot disposed in said case body and synchronously driven by said cam shaft of said engine,
an annular member having a communicating hole disposed within said case body and
an exhaust gas sump formed by said case body and said annular member and connected to said exhaust gas supply passage and further comprises
an orifice having a predetermined throttle effect.

13. A stratified charge type internal combustion engine according to claim 12, further comprising a cylinder block including a cylinder head associated with said combustion chamber, said combustion chamber being hemi-spherical in shape, an egg-shaped combustion chamber proximate said combustion chamber, a nozzle means between said combustion and egg-shaped combustion chambers and wherein said opening means is provided at the part of said cylinder head having a hemi-spherical shaped combustion chamber,
the diameter of the opening of said concave portion is smaller than that of a connecting port with said exhaust gas supply passage,
said exhaust gas supply passage has a filter for excluding dusts in the exhaust gases introduced from said exhaust passage, and
said engine has an intake pipe leading into said combustion chamber and opposed to said exhaust passage.

14. A stratified charge type internal combustion engine according to claim 11, wherein
said valve means comprises
a hydraulic valve drive means comprising
a pump means for producing a fluid under pressure which is synchronously driven by a crank shaft of said engine,
a fluid supply passage for supplying said fluid under pressure from said pump means,
a valve lifter comprising a cylinder connected to said fluid supply passage,
a piston disposed within said cylinder and connected to a valve member having a spring means and a valve head provided at said spring means,
said throttle means comprises a control valve for controlling the throttle amount thereof in accordance with at least one of the revolutions, boost pressure and load of said internal combustion chamber and further comprises
an orifice having a predetermined throttle effect.

15. A stratified charge type internal combustion engine according to claim 14, wherein said opening means has a concave portion, said combustion chamber is hemi-spherical in shape and has an upper portion, said exhaust gas supply passage has a connecting port leading into said combustion chamber, said combustion chamber has a curved intake pipe connected thereto, and,
said concave portion of said opening means is provided at said upper part of said hemi-spherical shaped combustion chamber,
said hemi-spherical shaped combustion chamber has an egg-shaped concave portion, a nozzle and a spark plug connecting said egg-shaped concave portion and said combustion chamber,
the diameter of said opening of said egg-shaped concave portion is smaller than that of said connecting port of said exhaust gas supply passage,
said exhaust gas supply passage has a filter for excluding dusts in the exhaust gases introduced from said exhaust passage,
said exhaust passage is provided parallel to a curved intake pipe for introducing the inflammable mixture into said combustion chamber with a spiral pattern about the axis of said cylinder.

16. A stratified charge type internal combustion engine according to claim 11, comprising a crank shaft in said engine and wherein
said valve means comprises
a hydraulic valve drive means comprising
a pump means for providing a fluid under pressure which is synchronously driven by said crank shaft,
a fluid supply passage for supplying said fluid under pressure from said pump means,
a valve lifter comprising a cylinder connected to said fluid supply passage,
a valve member having a spring means and a valve head provided at said spring means,
a piston disposed within said cylinder and connected to said valve member and
said throttle means comprises an orifice having a predetermined throttle effect.

17. A stratified charge type internal combustion engine according to claim 16, wherein said opening means has a concave portion, said engine has a cylinder head, said cylinder head has a concave portion, and a side wall, said engine has an intake pipe leading to said combustion chamber,
said concave portion of said opening means is provided at a part adjacent to said side wall of said cylinder head,
a preliminary combustion chamber has a fuel injection valve and a communicating hole connecting said preliminary combustion chamber and said combustion chamber, and said preliminary combustion chamber is disposed in opposition to said concave portion in said cylinder head,
the openings of said communicating hole and said concave portion are directed to the axis of said combustion chamber,
said exhaust gas supply passage has a filter for excluding dusts in exhaust gases introduced from said exhaust passage which is parallel to said intake pipe.

18. A stratified charge type internal combustion engine according to claim 16, wherein said opening means has a concave portion, said engine has a cylinder head, said cylinder head has a concave portion and a side wall, said engine has an intake pipe leading to said combusion chamber,
said concave portion of said opening means is provided at a part adjacent to said side wall of said cylinder head,
a preliminary combustion chamber has a fuel injection valve and a communicating hole connecting said preliminary combustion chamber and said combustion chamber, and said preliminary chamber is disposed in opposition to said concave portion in said cylinder head,
the opening of said communicating hole is directed in a tangential direction of said combustion chamber,
said opening of said concave portion is directed to the axis of said combustion chamber,
said exhaust gas supply passage has a filter for excluding dusts in exhaust gases introduced from said exhaust pipe which is disposed parallel to said intake pipe.

19. A stratified charge type internal combustion engine according to claim 16, wherein said opening means has a concave portion, said engine has a cylinder having a cylinder head having a side wall and a concave portion and a piston therein having a concave top portion, said engine further has an intake pipe leading into said combustion chamber, said concave portion of said opening means is disposed at a part adjacent to said side wall of said cylinder head, a fuel injection valve is disposed opposite to said concave portion of said cylinder head, the opening of said opening hole is directed to the axis of said combustion chamber, the injection hole of said fuel injection valve faces said concave portion of said piston, said piston having a flat bottom surface, said opening means is directed to the axis of said combustion chamber, said exhaust gas supply passage has a filter for excluding dusts in exhaust gases introduced from said exhaust pipe which is disposed parallel to said intake pipe.

20. A stratified charge type internal combustion engine according to claim 19, further comprising a piston having a top face, wherein the average diameter do and depth L of said nozzle means have a relation as follows:

$L > 0.5\ do,$ said average diameter do and depth L of said nozzle means have a relation as follows:

$do < L < 2.5\ do,$ the average cross section Ao of said nozzle means and said cross section A of said cylinder of said engine have a relation as follows:

$0.002\ A < Ao < 0.09\ A,$ and the axial direction of said nozzle means ranges through an angle between a line from the center of said opening means to a point positioned at a distance of $\frac{3}{4}$ d from the center of the top face of the piston when positioned at top dead center, where d is the distance between the top surface of said combustion chamber and said top face of said piston at top dead center, and a line from the center of said opening means to the center of said top face of said piston when positioned at 90 degrees after top dead center, in a vertical plane, and ranges through an angle between two circumscribing tangential lines running from the center of said opening mweans to a circle having a diameter (2/5) D, then D is the diameter of said cylinder of said engine, and an ignition plug, for igniting an introduced inflammable mixture charge, positioned in a region between a circle of a diamter D/2 and a circle of a diameter D, whereby exhaust gases may be introduced for filling said concave portion and from said concave portion through said nozzle means into said combustion chamber during an intake stroke of said engine in order to make said exhaust gases stay in a central portion of said combustion chamber without diffusing throughout said combustion chamber.

21. A stratified charge type internal combustion engine according to claim 5, wherein said engine has at least one cylinder, and the average cross section Ao of said concave portion and cross section A of a cylinder bore of said engine have a relation as follows:

$0.002\ A < Ao < 0.09\ A.$

22. A stratified charge type internal combustion engine according to claim 4, wherein said engine includes a wall forming a sub-chamber, and nozzle means connecting said sub-chamber with said combustion chamber, said opening hole being provided at said wall forming said sub-chamber, said sub-chamber also being termed a sub-combustion chamber.

23. A stratified charge type internal combustion engine according to claim 22, wherein the average diameter do and the depth L of said nozzle means have a relation as follows:

$L < 0.5\ do.$

24. A stratified charge type internal combustion engine according to claim 23, wherein said engine has a cylinder and said average diameter do and the depth L of said nozzle means have a relation as follows:

$do < L < 2.5\ do.$

25. A stratified charge type internal combustion engine according to claim 24, wherein the average cross-section Ao of said nozzle means and the cross-section A of a cylinder bore of said engine have a relation as follows:

$0.002A < Ao < 0.09A.$

26. A stratified charge type internal combustion engine according to claim 24, wherein said throttle means is arranged and constructed to supply a predetermined amount $V_E$ of said exhaust gases having the following ratio to the amount $V_I$ of the introduced inflammable mixture into said combustion chamber:

$0.03\ V_I < V_E < 0.12\ V_I.$

27. A stratified charge type internal combustion engine according to claim 26, wherein said ignition means is an ignition plug and further comprising a piston having a top surface in said cylinders and wherein the axial direction of said opening ranges through an angle between a line from said center of said opening means to a point positioned at a distance of $\frac{3}{4}$ d from the center of the top face of the piston when positioned at top dead center, d being the distance between the upper surface of said combustion chamber and the top face of said piston at top dead center, and a line from the center of said opening means to the center of said top face of said piston when positioned at 90 degrees after top dead center, in a vertical plane, and ranges through an angle between two circumscribing tangential lines running from the center of said opening means to a circle having a diameter $\frac{2}{5}$ D, D being the diameter of the cylinder bore of said engine, and said ignition plug for igniting an introduced inflammable mixture charge is positioned in a region between a circle of a diameter D/2 and a circle of a diameter D.

28. A stratified charge type internal combustion engine according to claim 27, further comprising a cam shaft operatively connected to said engine for rotating in synchronism therewith, said engine having a carburetor having an air cleaner, an intake manifold and a crank shaft, and wherein said valve means comprises a valve member having an end and having a spring member disposed within said opening means, a rocker arm having two ends for pressing an end portion of said valve member with one end thereof, and a cam for pressing the other end of said rocker arm, said cam being disposed for being driven by said crank shaft of said internal combustion engine, and said control valve comprises an exhaust valve of a diaphragm type having a diaphragm dividing same into first and second chambers, a spring within each of said first and second chambers, a valve seat connected to said diaphragm, and a needle valve for controlling flow between the needle of said valve and said valve seat, a first check valve having a casing member, a valve member having a first end portion and a second end portion with a valve head thereat, disposed coaxially in said casing member, a first check valve chamber having a spring for axially pressing said first end portion of said valve member provided therein and connected to said intake manifold of said engine, a second check valve chamber connected to said second chamber of said exhaust valve, a third check valve chamber divided from said second check valve chamber by said valve head at said second end of said valve member and connected to said air cleaner of said carburetor and a second check valve having a second casing member, a plate valve member dividing said second casing member into two chambers, one of said two chambers having a spring fitting into said plate valve member connected to said intake manifold of said engine, and the other of said two chambers connected to said first chamber of said exhaust valve.

29. A stratified charge type internal combustion engine according to claim 28, including a sub-combustion chamber connected to said combustion chamber for an opening hole, said sub-combustion chamber having a side wall and, wherein a spark plug as igniting means is provided in said side wall.

30. A stratified charge type internal combustion engine according to claim 29, further comprising a cam shaft and cam connected to said engine for rotation therewith, a rocker arm reciprocated by said cam, a cylinder head associated with said combustion chamber, intake and exhaust valves in said cylinder head, an intake pipe leading to said intake valve, and wherein said exhaust gas supply passage has a filter for occluding dusts in exhaust gases introduced from said exhaust passage which is disposed to be opposed and parallel to said intake pipe.

31. A stratified charge type internal combustion engine according to claim 28, comprising a single cylinder having a cylinder head associated with said combustion chamber and said combustion chamber having a side surface and an upper bottom surface having a corner part therebetween and wherein a spark plug as said ignition means is provided at said corner part of said upper bottom surface and said side surface of said combustion chamber in said cylinder, the axial direction of the nozzle of said opening means is directed to the axis of said combustion chamber, said exhaust gas supply passage has a filter for occluding dusts in exhaust gases introduced from said exhaust passage, an intake valve and an exhaust valve, which are provided to be opposed to each other in said cylinder head, a rocker arm and cam shaft for driving said intake and exhaust valves, and a crank shaft in said engine for driving said cam shaft and rocker arm.

32. A stratified charge type internal combustion engine according to claim 27, further comprising, a crank shaft in said engine, a plurality of valve lifters associated with each combustion chamber of each cylinder and a fluid supply passage having therein, a distribution valve for supplying synchronously a predetermined amount of fluid under pressure to each valve lifter of said plurality of said valve lifters respectively provided on said combustion chambers of said engine in response to an intake stroke of each cylinder of said engine, wherein said distribution valve comprises a rotary distribution valve means which comprises, a rotary distribution valve comprising, an annular cylinder having a peripheral groove therein and a radial groove connected to said peripheral groove and a passage surrounded by an inner pheripheral wall of said annular cylinder, said rotary distribution valve being driven by said crank shaft and a control ring comprising an annular cylinder having a radial groove penetrating from an inner wall to an outer wall threof and a screw part in a part of said outer peripheral wall surrounding said rotary distribution valve, an annular cylindrical casing having a peripheral groove on an inner peripheral wall and a radial groove connecting to said peripheral groove and penetrating said annular cylindrical casing, and a control rack having a screwed portion engaged to said screw part of said control ring, whereby a predetermined amount of said fluid under pressure may be synchronously supplied to each valve lifter by the relation of said peripheral groove of said rotary distribution valve, said radial groove of said control ring, and said groove of said annular cylindrical casing in response to an intake stroke of each of said combustion chambers of said engine.

33. A stratified charge type internal combustion engine according to claim 22, wherein the average cross section Ao of said nozzle means and the cross section A of a cylinder bore of said engine have a relation as follows:

$$0.002\, A < A_o < 0.09\, A.$$

34. A stratified charge type internal combustion engine according to claim 22, wherein said nozzle means is provided at said bottom portion of said concave portion of said wall for forming said combustion chamber.

35. A stratified charge type internal combustion engine according to claim 2, wherein
said opening means comprises an opening hole opening within said combustion chamber and being provided in a wall defining said combustion chamber.

36. A stratified charge type internal combustion engine according to claim 35, further comprising a cylinder and a piston in said cylinder associated with said combustion chamber, said piston having a top face and said combustion chamber having an upper surface, wherein
said valve means comprises
a magnetic valve comprising,
a magnetic core electrical switch means connected to said magnetic core to switch said magnetic valve ON or OFF in accordance with the variation of the negative pressure in an intake manifold of said engine,
a battery connected for operating said magnetic core, and
a valve member including spring means and head portion thereof provided at said opening means and being disposed within said magnetic core,
said throttle means having an orifice of predetermined throttle effect for supplying a predetermined amount, $V_E$ of exhaust gases having the following relation to an amount $V_I$ of an inflammable mixture introduced into said combustion chamber:

$$V_E < (0.03 \sim 0.12) V_I,$$

the axial direction of said opening ranging through an angle between a line from its center of said opening means to the point positioned at a distance of $\frac{3}{4}d$ from the center of said top face of said piston when positioned at a top dead center, d being the distance between the upper surface of said combustion chamber and said top face of said piston at top dead center, and a line from the center of said opening means to the center of said top face of said piston when positioned at 90 degrees after top dead center, in a vertical plane, and ranges through an angle between two circumscribing tangential lines running from the center of said opening means to a circle having a diameter (2/5)D, D being the diameter of cylinder bore of said engine, and
an ignition plug for igniting any inflammable mixture charge introduced, said plug being positioned in a region between a circle of diameter D/2 and a circle of a diameter D.

37. A stratified charge type internal combustion engine according to claim 2, wherein
said opening means comprises
an opening hole provided at a valve seat portion of said intake valve of said engine,
whereby said opening hole intermittently opens within said combustion chamber in accordance with the opening of said intake valve in the intake stroke of said engine.

38. A stratified charge type internal combustion engine according to claim 37, wherein said engine includes a cam shaft for rotation therewith, at least one cylinder and a piston having a top surface therein, said combustion chamber having an upper surface,
said valve means comprising an intake valve for introducing an inflammable mixture into said combustion chamber,
said throttle means comprises an orifice having a predetermined throttle effect,
said throttle means further comprising
a synchronizing valve connected to said opening means and comprising
a case body disposed in said engine,
a rotary disc having an arcuate slot disposed in said case body and synchronously driven by said cam shaft of said engine,
an annular member having a communicating hole interposed within said case body and
an exhaust gas sump formed by said case body and annular member and connected to said exhaust gas supply passage,
said throttle means being constructed and arranged to supply a predetermined amount $V_E$ of said exhaust gases having the following ratio to an amount $V_I$ of an inflammable mixture introduced into said combustion chamber, $$V_E < (0.03 \sim 0.12) V_I,$$

the axial direction of said opening ranging through an angle between a line from the center of said opening means to a point positioned at a distance of $\frac{3}{4}d$ from the center of the top face of said piston when top dead center, d being the distance between said upper surface of said combustion chamber and said top face of said piston at the top dead center and a line from the center of said opening means to the center of said top face of said piston when positioned at 90 degrees after top dead center, in a vertical plane, and ranges through an angle between two circumscribing tangential lines running from the center of said opening means to a circle having a diameter (2/5)D, wherein D is the diameter of said cylinder of said engine, and
an ignition plug for igniting any charge of inflammable mixture, said ignition plug being positioned in a region between a circle of a diameter D/2 and a circle of a diameter D.

39. A stratified charge type internal combustion engine according to claim 38, further comprising a cylinder block including a cylinder having a head including said combustion chamber,
a tube member as part of said exhaust gas supply passage, said combustion chamber having upper and side surfaces and a corner therebetween, and wherein
the cross sectional area of said tube member has a predetermined value in order to operate as an orifice having a predetermined throttle effect,
the axial direction of said tube member is directed to the central axis of said cylinder of said engine,
said intake valve has a valve head having an upper surface,
an arcuate-shaped shroud projects from the upper surface of said valve head of said intake valve in order to introduce an inflammable mixture into said combustion chamber in a spiral pattern,
a spark plug directed toward the axis of said cylinder is provided at said corner between said upper surface of said combustion chamber in said cylinder head and said side surface of said combustion chamber in said cylinder block.

40. A stratified charge type internal combustion engine according to claim 2, wherein said engine has a crankshaft,
said valve means comprises
a valve member having a spring member interposed within said opening means,
a rocker arm for pressing an end portion of said valve member with one end thereof, and
a cam and cam shaft for pressing the other end of said rocker arm by said cam, said cam shaft being driven by said crank shaft of said internal combustion engine.

41. A stratified charge type internal combustion engine according to claim 2, wherein
said valve means comprises a synchronizing valve connected to said opening means, said synchronizing valve comprising
a case body mounted proximate said engine,
a cam shaft operatively connected with said engine for rotating in synchronism therewith,
a rotary disc having an arcuate-shaped slot in said case body and synchronously driven by said cam shaft,
an annular member having a communicating hole disposed within said case body and connected to said exhaust gas supply passage,
an exhaust gas sump formed by said case body and annular member.

42. A stratified charge type internal combustion engine according to claim 2, wherein
said engine has a crank shaft,
said valve means comprises
a hydraulic valve drive means including
a pump means for producing a fluid under pressure, said pump means being connected to said crank shaft for being synchronously driven thereby,
a fluid supply passage for supplying said fluid under pressure from said pump means,
a valve lifter comprising a cylinder connected to said fluid supply passage,
a piston disposed within said cylinder and connected to a valve member having a spring means and a valve head provided at said spring means.

43. A stratified charge type internal combustion engine according to claim 42, further comprising a plurality of valve lifters and combustion chambers associated with said valve lifters, said engine having at least one cylinder,
a distribution valve being provided in said fluid supply passage for supplying synchronously a predetermined amount of said fluid under pressure to each valve lifter of said plurality of valve lifters respectively provided on said combustion chambers of said engine in response to an intake stroke of each cylinder of said engine.

44. A stratified charge type comprising combustion engine according to claim 2, wherein
said valve means comprises
a magnetic valve comprising
a magnetic core electrical switch means connected to said magnetic core to switch said magnetic valve ON or OFF in accordance with the variation of the negative pressure in an intake manifold of said engine,
a battery connected for operating said magnetic core, and
a valve member including spring means and head portion thereof provided at said opening means and being disposed within said magnetic core.

45. A stratified charge type internal combustion engine according to claim 2, wherein
said throttle means comprises orifice means of predetermined size.

46. A stratified charge type internal combustion engine according to claim 2, wherein
said engine has a cam shaft,
said throttle means comprises,
a synchronizing valve connected to said opening means comprising,
a case body proximate said engine,
a rotary disc having an arcuate slot disposed in said case body and synchronously driven by said cam shaft,
an annular member having a communicating hole disposed within said case body and an exhaust gas sump formed by said case body and said annular member and connected to said exhaust gas supply passage.

47. A stratified charge type internal combustion engine according to claim 2, wherein
said throttle means comprises control valve means for controlling the throttle effect thereof in accordance with the load of said internal combustion engine by detecting the intake manifold vacuum.

48. A stratified charge type internal combustion engine according to claim 47, wherein
said engine has an intake manifold and a carburetor having an air cleaner, and wherein said control valve comprises
an exhaust valve of a diaphragm type having
a diaphragm dividing said exhaust valve into two chambers,
spring means within each of said two chambers, and
a needle valve for controlling the throttle effect,
said needle valve having a valve seat connected to said diaphragm,
a first check valve having
a casing member,
a valve member disposed coaxially in said casing member, said valve member having first and second end portions,
a first chamber having a spring for axially pressing said first end portion of said valve member provided therein and being connected to said intake manifold of said engine,
a second chamber connected to said second chamber of said exhaust valve,
a third chamber divided from said second chamber by said valve head at said second end of said valve member and connected to said air cleaner of said carburetor, and
a second check valve having
a casing member,
a plate valve member dividing said casing member into two chambers, one of said two chambers having a spring fitting to said plate valve member connected to said intake manifold of said engine, the other of said two chambers being connected to said first chamber of said exhaust valve.

49. A stratified charge type internal combustion engine according to claim 2, wherein
said throttle means are arranged and constituted to supply a predetermined amount, $V_E$ of said exhaust gases having the following relation to an amount $V_I$ of an inflammable mixture introduced into said combustion chamber, $$V_E < (0.03 \sim 0.12) V_I \text{ (in a spark ignition engine)}.$$

50. A stratified charge type internal combustion engine according to claim 2, further comprising a piston associated with said combustion chamber,
   a concave portion having a nozzle means provided in said combustion chamber wherein the volume V of said concave portion and the volume Vc of said combustion chamber when said piston is positioned at top dead center have a relation as follows:

$$V \leq 0.3 \, Vc.$$

51. A stratified charge type internal combustion engine according to claim 2, wherein
   said throttle means are arranged and constituted to supply a predetermined amount, $V_E$ of said exhaust gases having the following relation to an amount $V_I$ of an inflammable mixture introduced into said combustion chamber, $$V_E < (0.03 < 0.25) V_I \text{ (in a diesel engine)}.$$

52. A stratified charge type combustion process for an internal combustion engine of the overhead valve type, wherein an inflammable mixture of air and fuel supplied into a combustion chamber of said internal combustion engine is ignited and burned, comprising the steps of
   supplying an inflammable mixture into the peripheral portion and exhaust gases into a central portion of said combustion chamber during an intake stroke of said engine,
   to form a region containing a high concentration of exhaust gases in said central portion of said combustion chamber, encompassed by said inflammable mixture charge in said combustion chamber,
   carrying out a compression stroke of said engine, and igniting said inflammable mixture charge and burning said stratified charges of said exhaust gases and inflammable mixture charge, thereby causing combustion to proceed from the peripheral portion to the central portion of said chamber.

53. The method as defined in claim 52 wherein additional inflammable mixture is combined with said exhaust gas supplied to said central portion.

54. The method as defined in claim 53 wherein said inflammable mixture is lean and said additional inflammable mixture is rich.

55. A process for producing a stratified charge in an overhead valve type internal combustion engine such that the quantity of nitrogen oxides in subsequent combustion is reduced without increase in the quantity of hydrocarbons and carbon monoxide produced, comprising the steps of
   introducing a charge of exhaust gas into the central portion of a combustion chamber in said engine;
   introducing an inflammable mixture charge into the periphery of said combustion chamber in such manner that said inflammable mixture charge encompasses said exhaust gas charge to produce a stratified charge; said charges being intoduced during an intake stroke; and
   igniting said inflammable mixture charge by ignition means disposed proximate the periphery of said combustion chamber and thus within said inflammable mixture charge.

56. A process for producing a stratified charge in an overhead valve type internal combustion engine as defined in claim 55, wherein said combustion chamber has a cylindrical surface and said inflammable mixture is introduced in a direction tangential to said cylindrical surface.

57. A stratified charge type internal combustion engine of the overhead valve type, comprising
   a combustion chamber having a piston therein,
   an opening means opening into said combustion chamber and directed toward the central portion of said chamber,
   an exhaust gas passage leading from said chamber for removal of exhaust gas therefrom,
   an exhaust gas supply passage communicating with said exhaust gas passage and said opening means for supplying exhaust gas from said exhaust gas passage to said opening means and to said central portion of said chamber,
   exhaust gas supply valve means disposed and arranged for opening and closing said exhaust gas supply passage for transferring exhaust gas therethrough during an intake stroke of said piston,
   throttle means in said exhaust gas supply passage for controlling the quantity of exhaust gas supplied to said opening means,
   intake valve means for supplying an inflammable gas mixture to the periphery of said combustion chamber, and
   ignition means for igniting said inflammable mixture, said ignition means being disposed for igniting said inflammable mixture proximate the periphery of said combustion chamber, and for causing combustion to proceed from the peripheral portion of said chamber to the central portion thereof,
   whereby a stratified charge may be supplied to a combustion chamber during an intake stroke of said piston, said stratified charge being supplied so that exhaust gas is disposed in the central portion of said chamber and is encompassed by inflammable mixture in the periphery of said chamber in preparation for the following compression stroke and subsequent combustion.

58. A stratified charge type internal combustion engine as defined in claim 57, wherein said chamber is cylindrical and said central portion thereof is the axial portion thereof.

59. A stratified charge type internal combustion engine as defined in claim 58, wherein said intake valve means is constructed and arranged for introducing said inflammable mixture in a direction essentially tangential to said cylindrical chamber.

60. A stratified charge type internal combustion engine as defined in claim 57, wherein said exhuast gas supply valve means is arranged for closing said exhaust supply passage prior to closing said intake valve means.

61. A stratified charge type internal combustion engine as defined in claim 57, wherein said ignition means includes spark plug means.

62. A stratified charge type combustion process for an overhead valve type of an internal combustion engine, wherein an inflammable mixture of air and fuel supplied into a combustion chamber of said internal combustion engine is ignited and burned, comprising the steps of supplying exhaust gases into a central portion of said combustion chamber and concurrently supplying an inflammable mixture into a peripheral portion of said combustion chamber during an intake stroke independently of said inflammable mixture, in order to make said exhaust gases stay in said central portion of said combustion chamber without diffusing throughout said combustion chamber, forming one region containing a high concentration of exhaust gases in said central portion of said combustion chamber and forming another region containing said inflammable mixture charge in a manner to encompass said one region therewith within said combustion chamber during a compression stroke of said engine, thereby providing stratified charges of said one region of said exhaust gases and said another region of said inflammable mixture charge, and igniting said peripheral inflammable mixture charbe by ignition means and burning said stratified charges of said exhaust gases and inflammable mixture charge so as to make the combustion proceed to the central portion from the peripheral portion in the combustion chamber.

* * * * *